(12) United States Patent
Kim et al.

(10) Patent No.: US 11,113,024 B2
(45) Date of Patent: Sep. 7, 2021

(54) ELECTRONIC DEVICE AND METHOD FOR SHARING INFORMATION THEREOF

(71) Applicant: SAMSUNG ELECTRONICS CO., LTD., Suwon-si (KR)

(72) Inventors: Jiwon Kim, Seoul (KR); Kyuok Choi, Seoul (KR); Chaekyung Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 239 days.

(21) Appl. No.: 15/984,630

(22) Filed: May 21, 2018

(65) Prior Publication Data
US 2018/0336011 A1 Nov. 22, 2018

(30) Foreign Application Priority Data
May 22, 2017 (KR) .......................... 10-2017-0063084

(51) Int. Cl.
*G06F 17/00* (2019.01)
*G06F 3/16* (2006.01)
(Continued)

(52) U.S. Cl.
CPC ............ *G06F 3/167* (2013.01); *G06F 3/0482* (2013.01); *H04L 51/046* (2013.01); *H04L 51/10* (2013.01);
(Continued)

(58) Field of Classification Search
CPC ...... G06F 3/167; G06F 3/0482; G06F 3/0488; H04L 51/046; H04L 51/10; G06Q 10/1095
(Continued)

(56) References Cited

U.S. PATENT DOCUMENTS

| 8,301,174 B2 * | 10/2012 | An ................... H04M 1/72457 455/457 |
| 2009/0036149 A1 * | 2/2009 | Liu ........................ H04W 4/20 455/466 |

(Continued)

FOREIGN PATENT DOCUMENTS

KR  10-2016-0022147  2/2016

OTHER PUBLICATIONS

Korean Office Action dated Feb. 16, 2021 for KR Application No. 10-2017-0063084.

*Primary Examiner* — Cesar B Paula
*Assistant Examiner* — James H. Blackwell
(74) *Attorney, Agent, or Firm* — Nixon & Vanderhye P.C.

(57) ABSTRACT

The present disclosure relates to an electronic device. The electronic device may include: a display; a communication module comprising communication circuitry; a processor; and a memory configured to store information on an application executed by the processor and information on a screen output through the display, wherein the processor is configured to receive an input for execution of a first application related to provision of a communication service, to determine information related to an other party of the communication service based on the received input, to determine whether the information related to the other party is included on a screen for a second application output through the display if the input is received, and to transmit the information related to the other party included on the screen for the second application to the other party through the communication module, if the information related to the other party is included on the screen for the second application.

18 Claims, 22 Drawing Sheets

(51) Int. Cl.
  *H04L 12/58* (2006.01)
  *G06F 3/0482* (2013.01)
  *G06Q 10/10* (2012.01)
  *G06F 3/0488* (2013.01)
(52) U.S. Cl.
  CPC ....... *G06F 3/0488* (2013.01); *G06Q 10/1095* (2013.01)
(58) Field of Classification Search
  USPC .......................................................... 715/728
  See application file for complete search history.

(56) References Cited

U.S. PATENT DOCUMENTS

| | | | | |
|---|---|---|---|---|
| 2009/0094531 A1* | 4/2009 | Danieli | ............... | H04M 7/0027 715/753 |
| 2010/0081475 A1* | 4/2010 | Chiang | ................ | G06F 3/0483 455/564 |
| 2010/0153577 A1* | 6/2010 | Wohlert | ................ | H04L 67/303 709/231 |
| 2010/0248788 A1* | 9/2010 | Yook | .................... | G06F 3/0481 455/566 |
| 2011/0275391 A1* | 11/2011 | Lee | ...................... | H04W 16/20 455/500 |
| 2012/0003965 A1* | 1/2012 | Eisinger | .............. | H04M 1/7253 455/414.1 |
| 2013/0185347 A1* | 7/2013 | Romano | ............. | H04L 12/1818 709/203 |
| 2014/0096053 A1* | 4/2014 | Lee | ....................... | G06F 3/0488 715/769 |
| 2014/0108568 A1* | 4/2014 | Lee | .................... | H04L 65/4015 709/206 |
| 2014/0188956 A1 | 7/2014 | Subba et al. | | |
| 2014/0372555 A1* | 12/2014 | Brunsman | ........... | H04L 65/4015 709/217 |
| 2015/0040029 A1* | 2/2015 | Koum | .................... | H04W 4/20 715/748 |
| 2015/0172238 A1* | 6/2015 | Ahmed | .............. | H04N 21/4788 709/217 |
| 2016/0072861 A1* | 3/2016 | Woolsey | ............... | H04L 51/046 455/414.1 |
| 2016/0073223 A1* | 3/2016 | Woolsey | ............... | G06F 3/0484 455/457 |
| 2016/0142913 A1* | 5/2016 | Ghosh | .................. | H04W 4/021 726/5 |
| 2016/0150009 A1* | 5/2016 | LeRoy | .................. | G06Q 10/10 709/206 |
| 2017/0251173 A1* | 8/2017 | Siminoff | ................ | H04N 7/186 |

\* cited by examiner

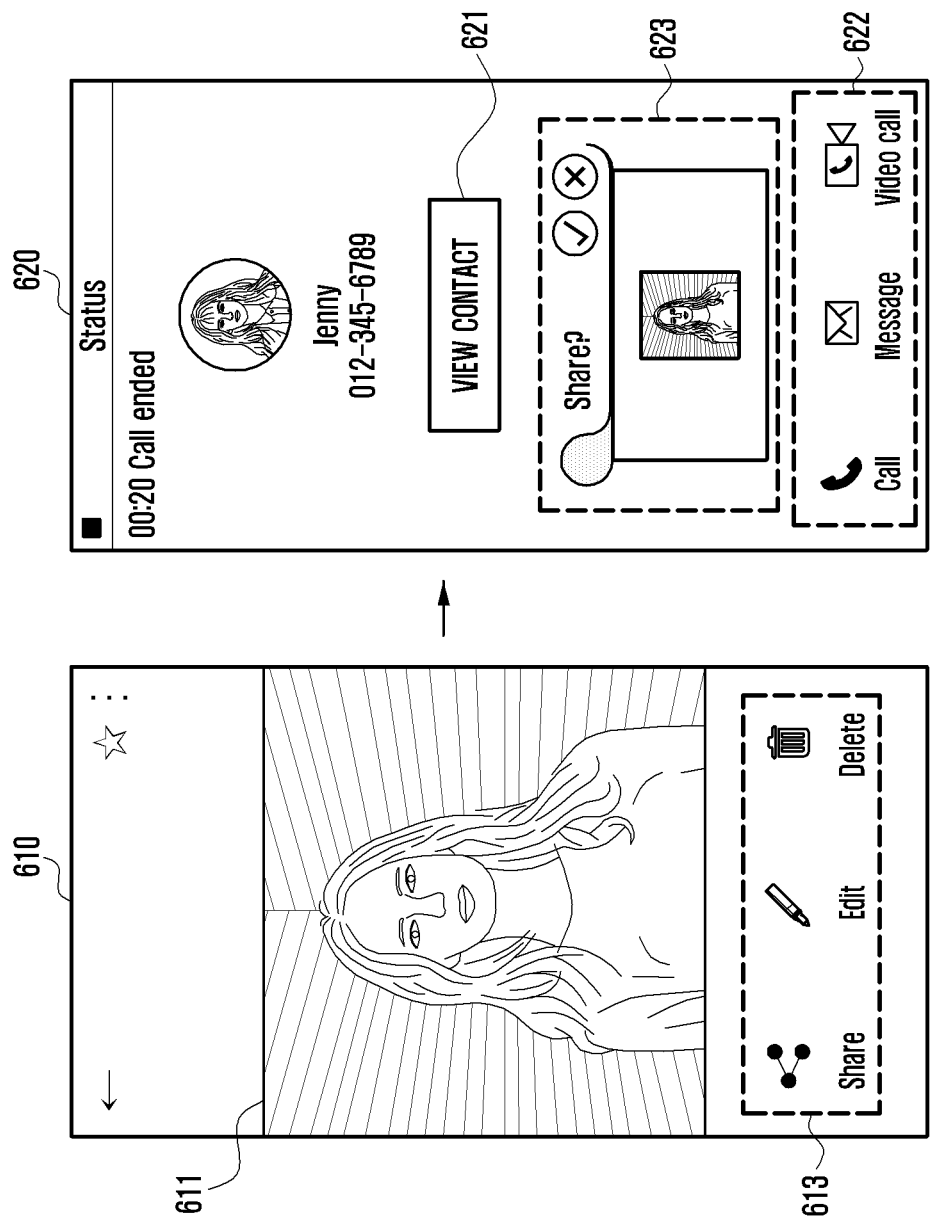

ELECTRONIC DEVICE AND METHOD FOR SHARING INFORMATION THEREOF

CROSS-REFERENCE TO RELATED APPLICATION

This application is based on and claims priority under 35 U.S.C. § 119 to Korean Patent Application No. 10-2017-0063084, filed on May 22, 2017, in the Korean Intellectual Property Office, the disclosure of which is incorporated by reference herein in its entirety.

BACKGROUND

Field

The disclosure relates to an electronic device and a method for sharing information thereof, and for example, to a method and an apparatus for sharing, for example, information related to the other party of a communication service stored in an electronic device with the other party.

Description of Related Art

With the recent development of technology, an electronic device may perform various functions in a complex manner. For example, electronic devices supporting various user functions such as a mobile communication terminal, a personal digital assistant (PDA), an electronic notebook, a smart phone, and a tablet PC (personal computer) are being released. For example, a user may make a voice call with the other party and use the Internet by using an electronic device, and reproduce multimedia contents such as photographs and music by using an electronic device or store the multimedia contents in the electronic device.

A user can share information such as a user's schedule stored in the electronic device with users of other electronic devices. For example, the electronic device may transmit a text message, to which contents related to a schedule related to the other party in the user's schedule are input, to the electronic device of the other party. Alternatively, the electronic device may send a photograph-attached email to an email account of the other party. Generally, however, when a user wants to share information stored in an electronic device with the other party, he/she should perform a user input, such as selecting information to be shared, executing an application for information transmission, and inputting information (e.g., telephone number, email account, or the like) for the electronic device of the other part according to a user interface, several times, which results in degrading the user convenience of the user.

SUMMARY

According to various embodiments of the present disclosure, it may be possible for a user to easily transmit information to be shared with another party to an electronic device of the other party.

In accordance with an aspect of the present disclosure, an electronic device is provided. The electronic device may include: a display; a communication module comprising communication circuitry; a processor; and a memory configured to store information on an application executed by the processor and information on a screen output through the display, wherein the processor is configured to receive an input for execution of a first application related to provision of a communication service, to determine information related to an other party of the communication service based on the received input, to determine whether the information related to the other party is included on a screen for a second application output through the display if the input is received, and to transmit the information related to the other party included on the screen for the second application to the other party through the communication module if the information related to the other party is included on the screen for the second application.

In accordance with another aspect of the present disclosure, a method for sharing information of an electronic device is provided. The method may include: receiving an input for execution of a first application related to provision of a communication service; determining information related to an other party of the communication service based on the received input; determining whether the information related to the other party is included on a screen for a second application output through a display of the electronic device if the input is received; and transmitting the information related to the other party included on the screen for the second application to the other party through a communication module of the electronic device if the information related to the other party is included on the screen for the second application.

Accordingly, embodiments of the present disclosure may allow a user to easily transmit information to be shared with the other party to an electronic device of the other party.

The effects that may be achieved by the embodiments of the present disclosure are not limited to those mentioned above. That is, other effects that are not mentioned may be understood by those skilled in the art to which the present disclosure pertains from the following description.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 6 is a diagram illustrating an example of performing a function of sharing a photograph related to a call partner after a call ends according to various embodiments of the present disclosure;

Figure 8:
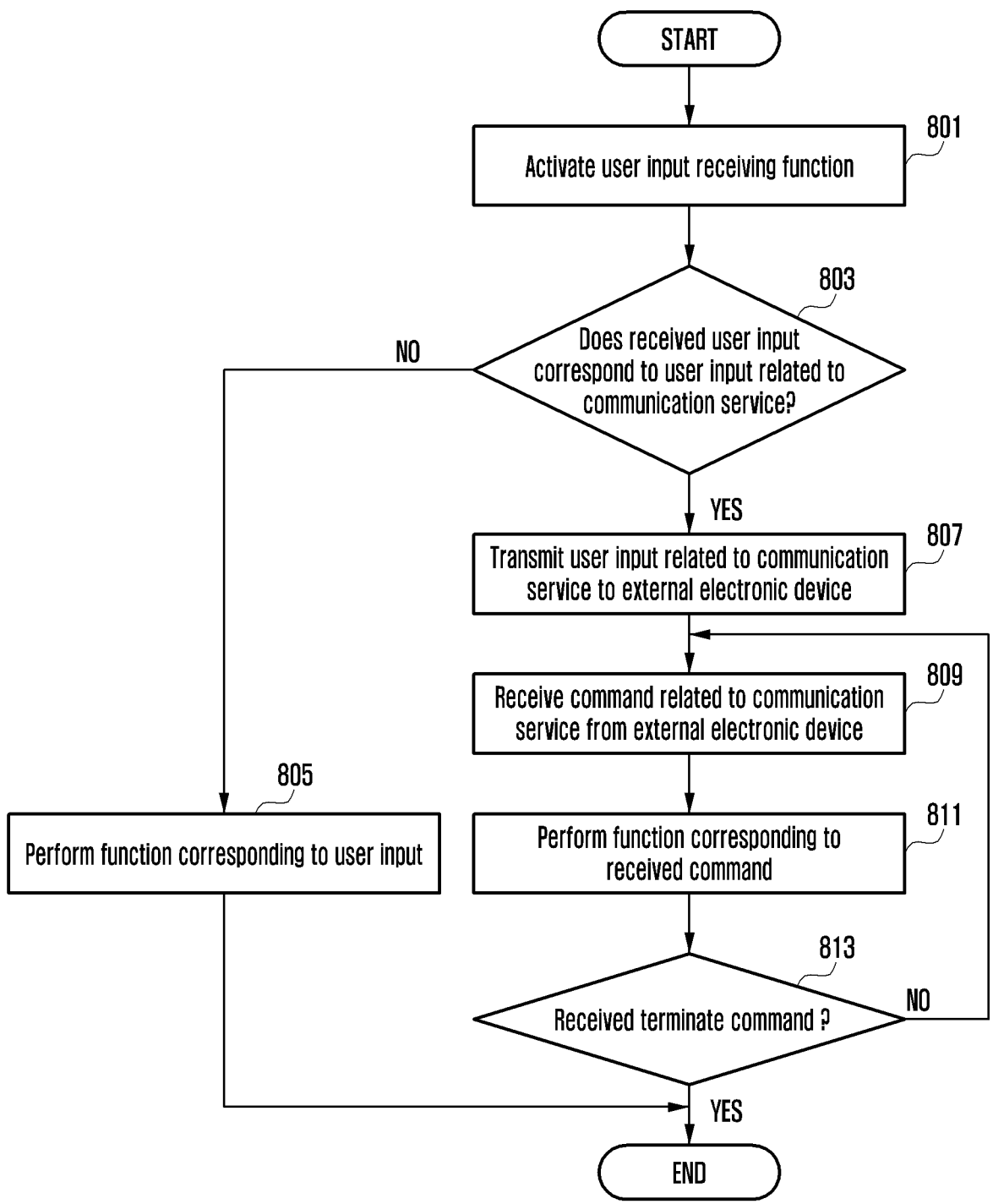
Figure 9A:
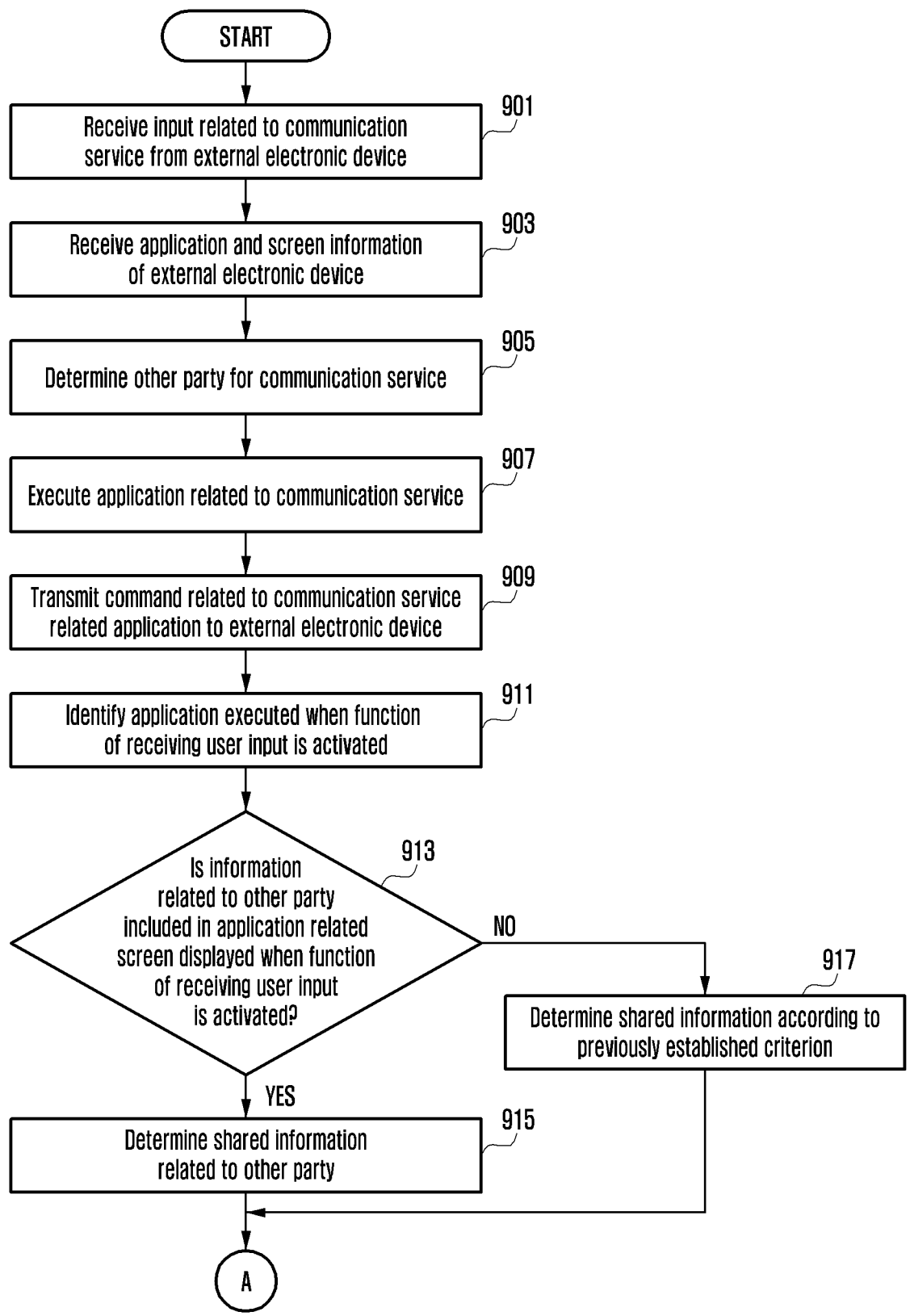
Figure 9B:
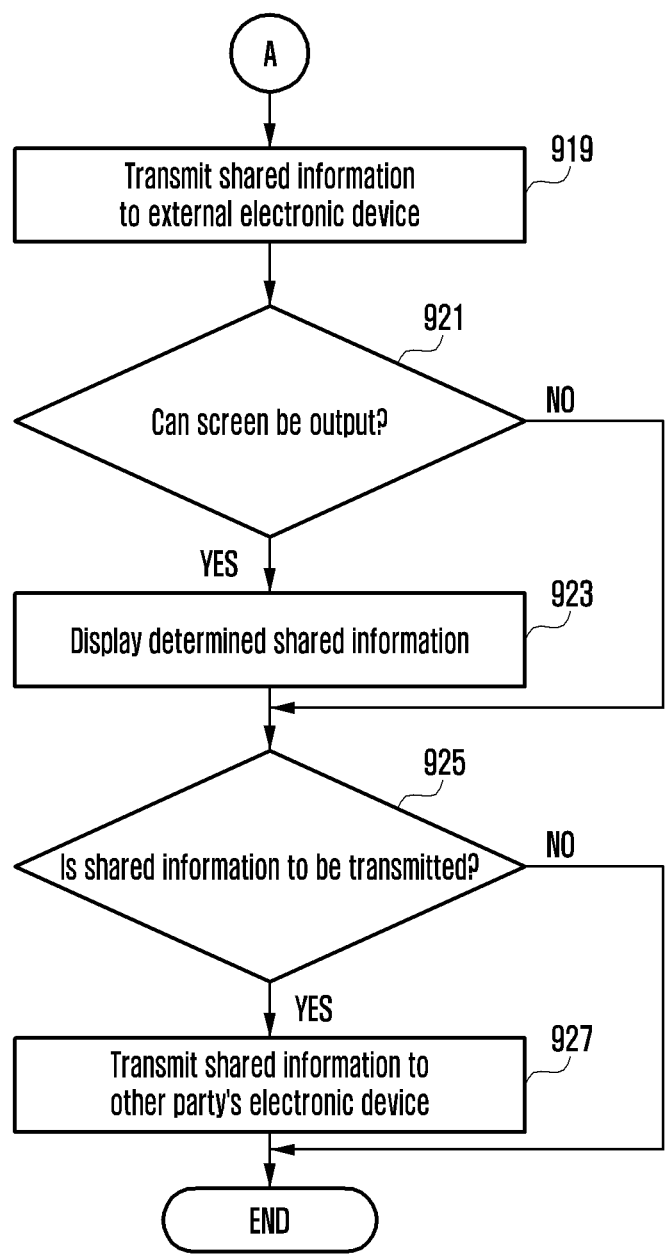
Figure 10:
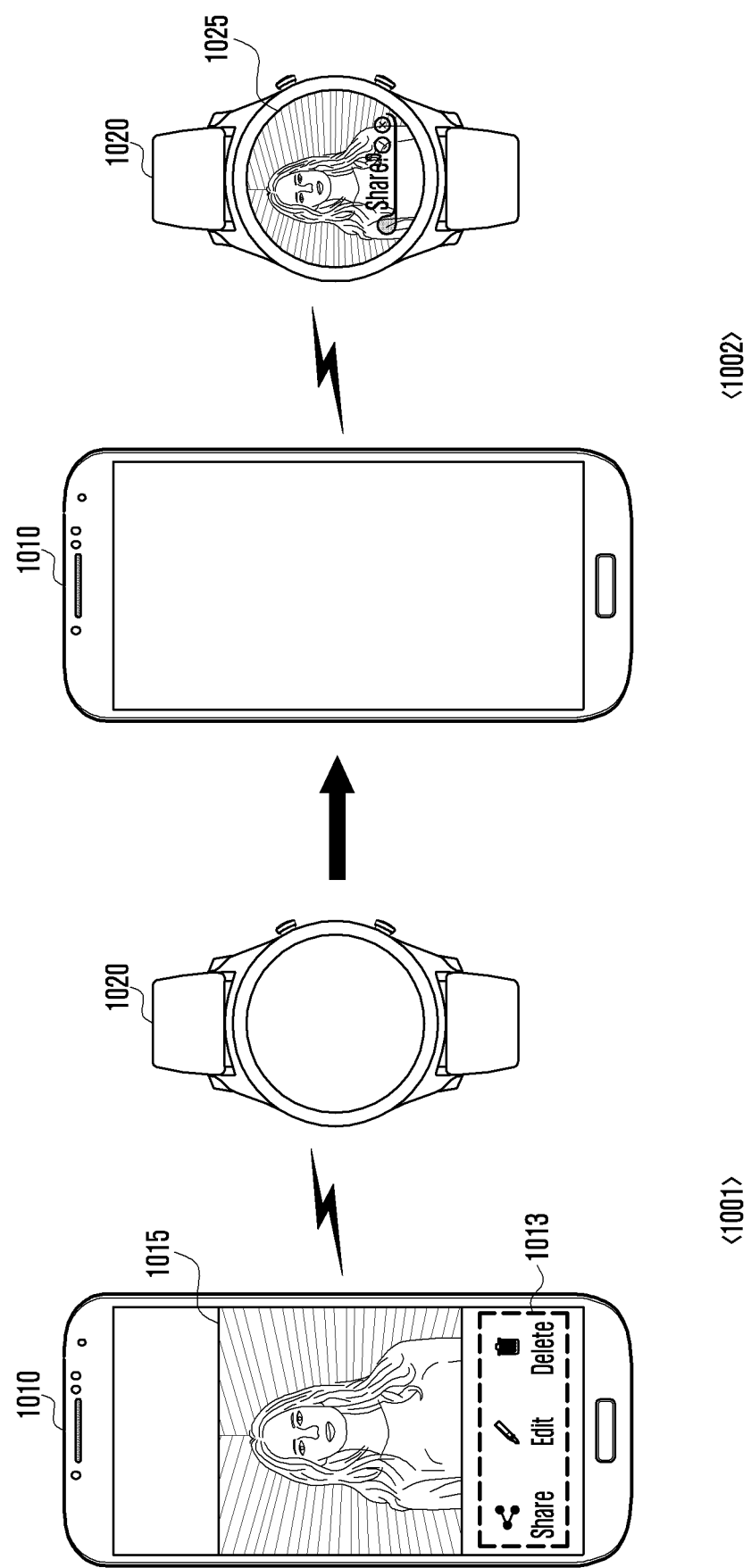
Figure 11:
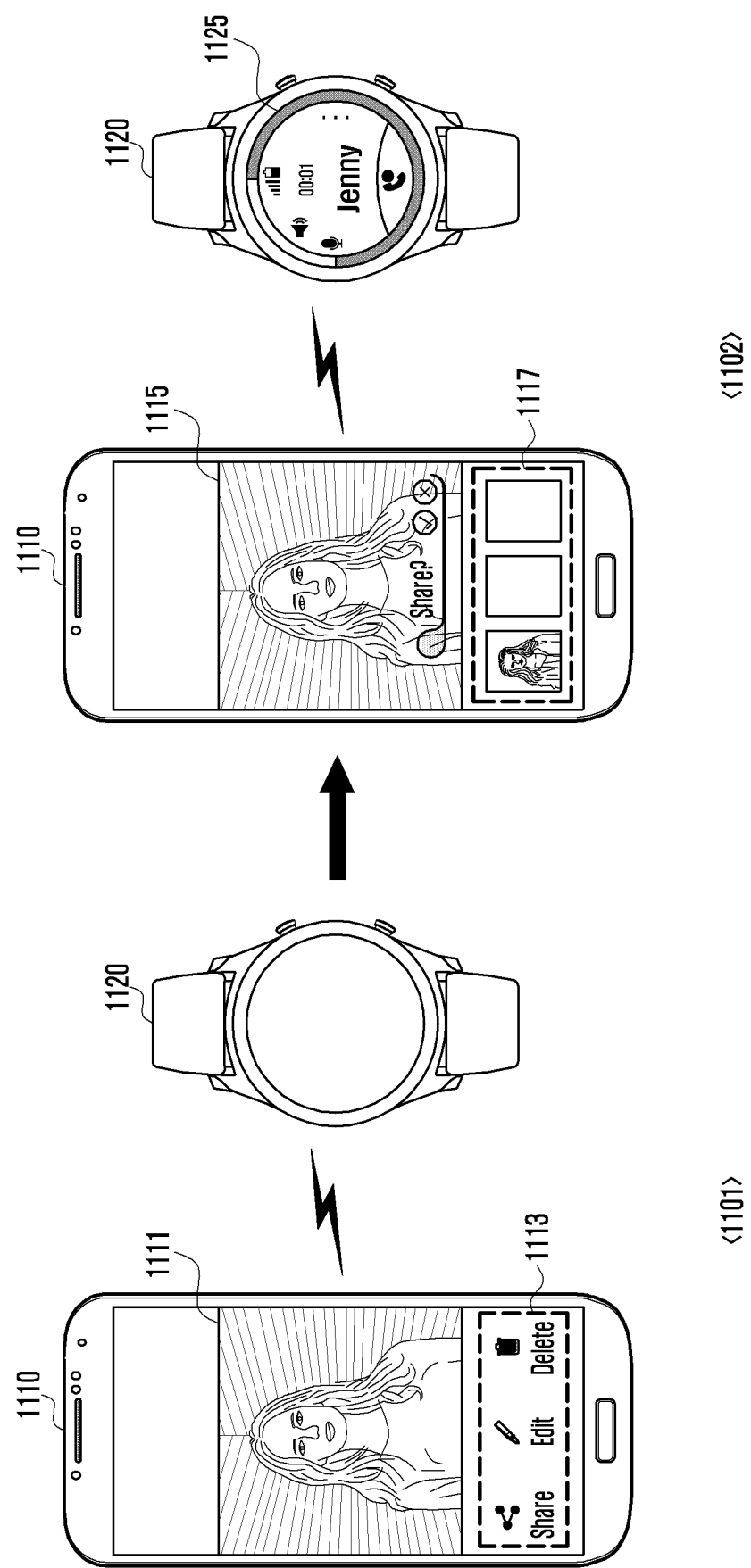
Figure 12:
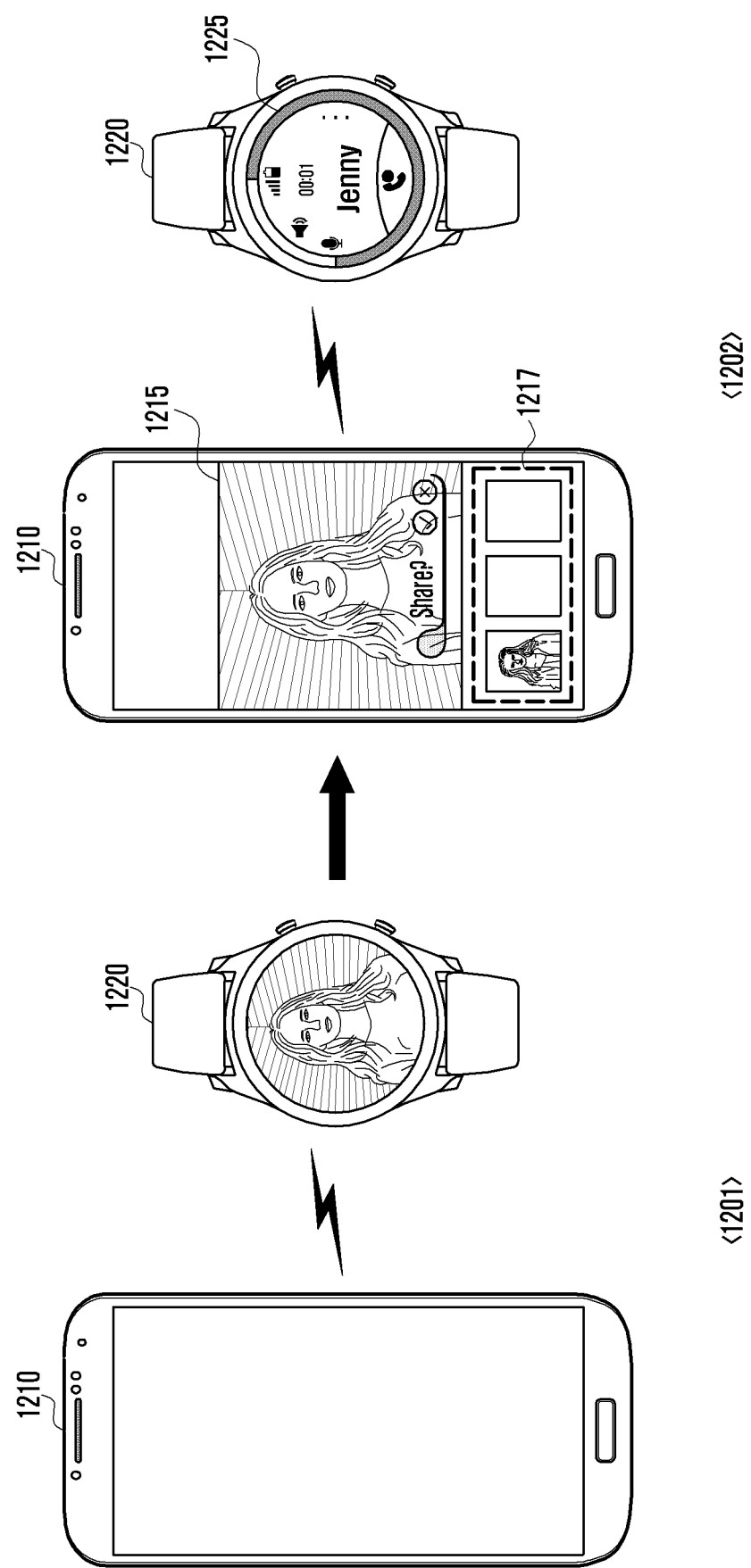
Figure 13:
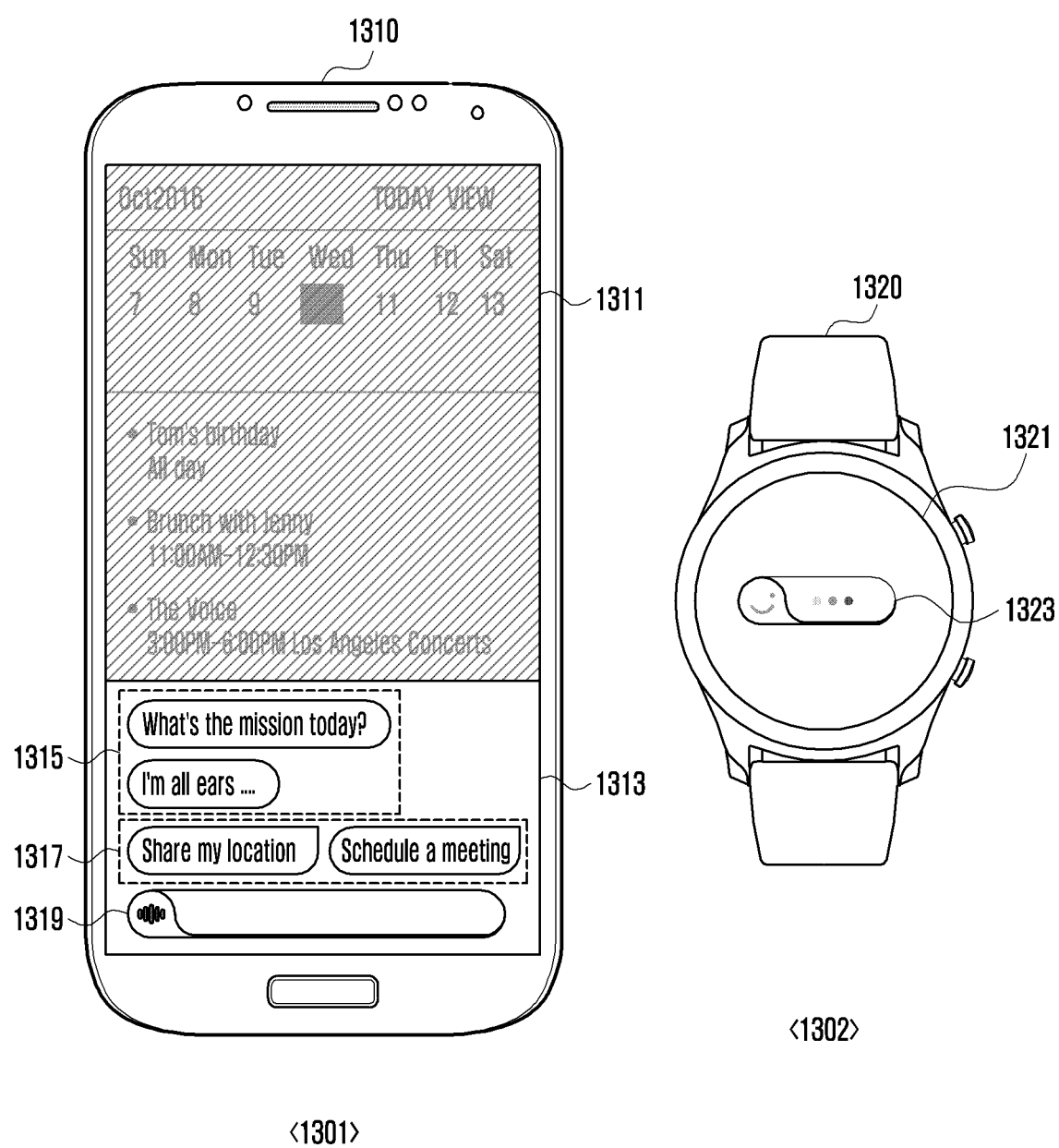
Figure 14:
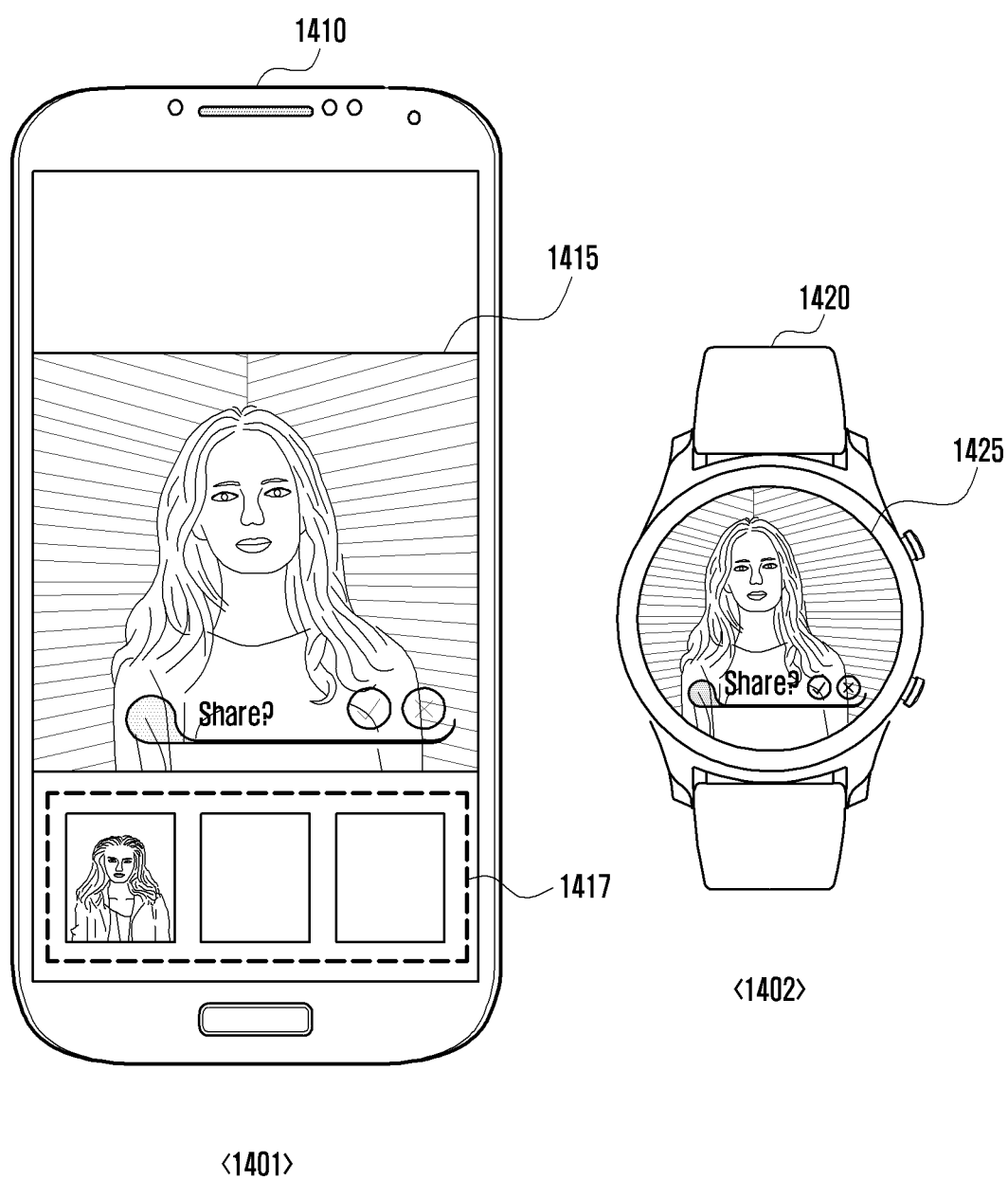

7A and 7B are diagrams illustrating an example of performing a function of sharing information related to an Internet browser screen using a message according to various embodiments of the present disclosure;

FIG. 8 is a flowchart illustrating a method for sharing information of an external electronic device communicating with an electronic device according to various embodiments of the present disclosure;

FIGS. 9A and 9B are flowcharts illustrating a method for sharing information of an electronic device communicating with an external electronic device according to various embodiments of the present disclosure;

FIG. 10 is a diagram illustrating an example of performing a function of sharing a photograph related to a call partner displayed on a screen of an electronic device according to various embodiments of the present disclosure;

FIG. 11 is a diagram illustrating an example of performing a function of sharing a photograph related to a call partner displayed on a screen of an electronic device according to various embodiments of the present disclosure;

FIG. 12 is a diagram illustrating an example of performing a function of sharing a photograph related to a call partner displayed on a screen of an electronic device according to various embodiments of the present disclosure;

FIG. 13 is a diagram illustrating an example of a screen related to an application that provides a function of receiving a user input displayed on displays of an electronic device and an external electronic device, respectively, according to various embodiments of the present disclosure; and FIG. 14 is a diagram illustrating an example of a user interface capable of selecting whether to transmit information related to the other party displayed on displays of an electronic device and an external electronic device, respectively, according to various embodiments of the present disclosure.

DETAILED DESCRIPTION

Hereinafter, various example embodiments of the present disclosure will be described with reference to the accompanying drawings. However, it should be understood that there is no intent to limit the present disclosure to the particular forms disclosed herein; rather, the present disclosure should be understood to cover various modifications, equivalents, and/or alternatives of the various example embodiments of the present disclosure. In describing the drawings, similar reference numerals may be used to designate similar elements.

As used herein, the expression "have", "may have", "include", or "may include" refers to the existence of a corresponding feature (e.g., numeral, function, operation, or element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may be used to refer to various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposed between them. On the other hand, it may be understood that when an element (e.g., first element) is referred to as being "directly connected," or "directly coupled" to another element (second element), there is no element (e.g., third element) interposed between them.

The expression "configured to" used in the present disclosure may be used interchangeably with, for example, "suitable for", "having the capacity to", "designed to", "adapted to", "made to", or "capable of" according to the situation. The term "configured to" may not necessarily imply "specifically designed to" in hardware. In some situations, the expression "device configured to" may refer to a situation in which the device, together with other devices or components, "is able to". For example, the phrase "processor adapted (or configured) to perform A, B, and C" may refer, for example, and without limitation, to a dedicated processor (e.g. embedded processor) for performing the corresponding operations or a generic-purpose processor (e.g., central processing unit (CPU) or application processor (AP)), or the like, that can perform the corresponding operations by executing one or more software programs stored in a memory device.

The terms used in the present disclosure are only used to describe specific embodiments, and are not intended to limit the present disclosure. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings of the contextual meanings in the relevant field of art, and are not to be interpreted to have ideal or excessively formal meanings unless clearly defined in the present disclosure. In some cases, even where the term is defined in the present disclosure, it should not be interpreted to exclude embodiments of the present disclosure.

An electronic device according to various example embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device, or the like, but is not limited thereto. According to various example embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit), or the like, but is not limited thereto.

According to some example embodiments, the electronic device may be a home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame, or the like, but is not limited thereto.

According to another example embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.), or the like, but is not limited thereto.

According to some example embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter), or the like, but is not limited thereto. The electronic device according to various example embodiments of the present disclosure may be a combination of one or more of the aforementioned various devices. The electronic device according to some example embodiments of the present disclosure may be a flexible device. Further, the electronic device according to an example embodiment of the present disclosure is not limited to the aforementioned devices, and may include a new electronic device according to the development of technology.

Hereinafter, an electronic device according to various example embodiments will be described with reference to the accompanying drawings. As used herein, the term "user" may indicate a person who uses an electronic device or a device (e.g., an artificial intelligence electronic device) that uses an electronic device.

Figure 1:
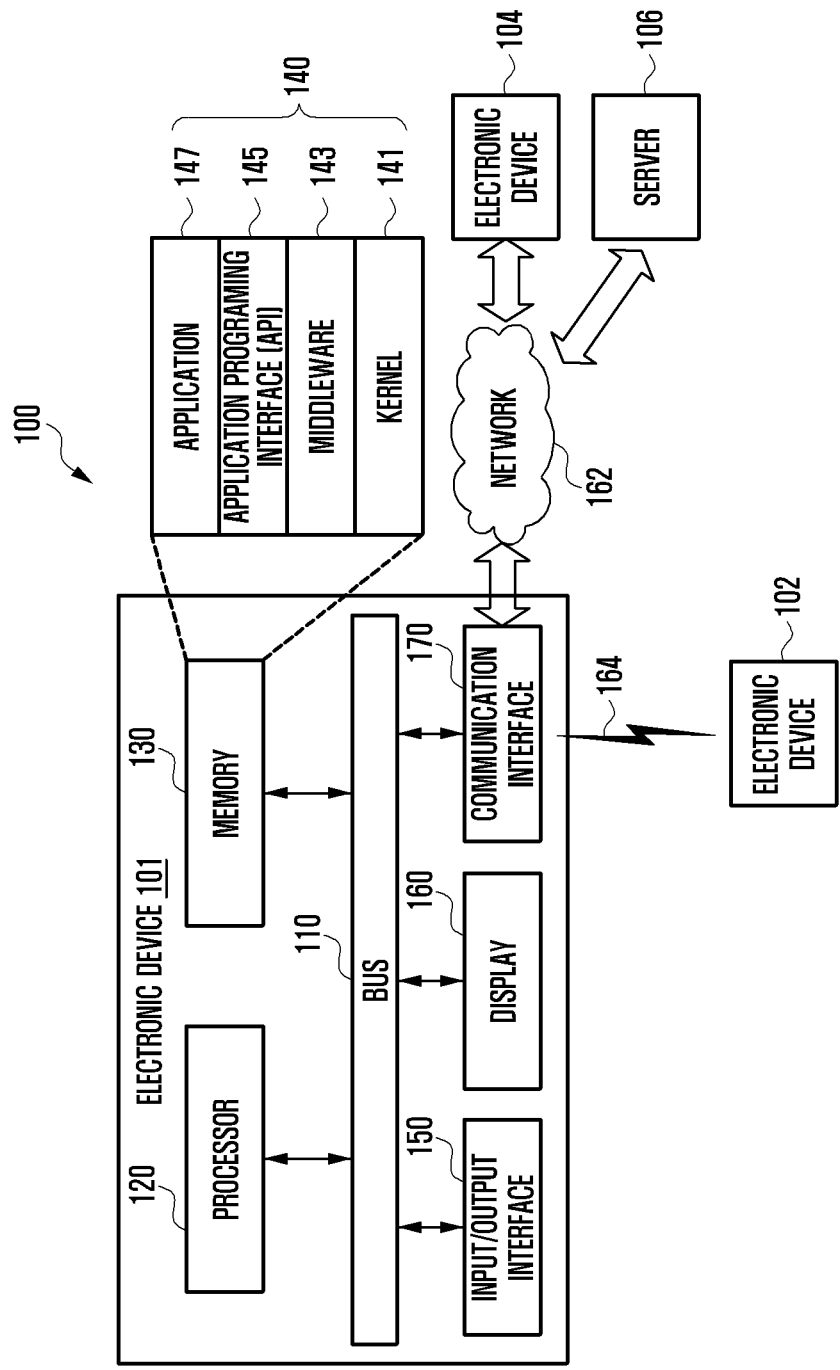
FIG. 1 is a block diagram illustrating network environment including an electronic device according to various embodiments of the present disclosure.

FIG. 1 is a block diagram illustrating a network environment including an electronic device according to various embodiments of the present disclosure.

An electronic device 101 within a network environment 100, according to various embodiments, will be described with reference to FIG. 1.

Referring to FIG. 1, the electronic device 101 may include a bus 110, a processor (e.g., including processing circuitry) 120, a memory 130, an input/output interface (e.g., including input/output circuitry) 150, a display 160, and a communication interface (e.g., including communication circuitry) 170. According to an embodiment of the present disclosure, the electronic device 101 may omit at least one of the above components or may further include other components.

The bus 110 may include, for example, a circuit which interconnects the components 110 to 170 and delivers a communication (e.g., a control message and/or data) between the components 110 to 170.

The processor 120 may include various processing circuitry, such as, for example, and without limitation, one or more of a dedicated processor, a Central Processing Unit (CPU), an Application Processor (AP), and/or a Communication Processor (CP), or the like. The processor 120 may carry out, for example, calculation or data processing relating to control and/or communication of at least one other component of the electronic device 101.

The memory 130 may include a volatile memory and/or a non-volatile memory. The memory 130 may store, for example, commands or data relevant to at least one other component of the electronic device 101. According to an embodiment of the present disclosure, the memory 130 may store software and/or a program 140. The program 140 may include, for example, a kernel 141, middleware 143, an Application Programming Interface (API) 145, and/or application programs (or "applications") 147. At least some of the kernel 141, the middleware 143, and the API 145 may be referred to as an Operating System (OS).

The kernel 141 may control or manage system resources (e.g., the bus 110, the processor 120, or the memory 130) used for performing an operation or function implemented in the other programs (e.g., the middleware 143, the API 145, or the application programs 147). Furthermore, the kernel 141 may provide an interface through which the middleware 143, the API 145, or the application programs 147 may access the individual components of the electronic device 101 to control or manage the system resources.

The middleware 143, for example, may serve as an intermediary for allowing the API 145 or the application programs 147 to communicate with the kernel 141 to exchange data.

Also, the middleware 143 may process one or more task requests received from the application programs 147 according to priorities thereof. For example, the middleware 143 may assign priorities for using the system resources (e.g., the bus 110, the processor 120, the memory 130, or the like) of the electronic device 101, to at least one of the application programs 147. For example, the middleware 143 may perform scheduling or loading balancing on the one or more task requests by processing the one or more task requests according to the priorities assigned thereto.

The API 145 is an interface through which the application programs 147 control functions provided from the kernel 141 or the middleware 143, and may include, for example, at least one interface or function (e.g., instruction) for file control, window control, image processing, character control, and the like.

The input/output interface 150, for example, may function as an interface that may transfer commands or data input from a user or another external device to the other element(s) of the electronic device 101. Furthermore, the input/output interface 150 may include various input/output circuitry and output the commands or data received from the other element(s) of the electronic device 101 to the user or another external device.

Examples of the display 160 may include a Liquid Crystal Display (LCD), a Light-Emitting Diode (LED) display, an Organic Light-Emitting Diode (OLED) display, an active matrix OLED (AMOLED), a MicroElectroMechanical Systems (MEMS) display, and an electronic paper display, or the like, but is not limited thereto. The display 160 may display, for example, various types of contents (e.g., text, images, videos, icons, or symbols) to users. The display 160 may include a touch screen, and may receive, for example, a touch, gesture, proximity, or hovering input using an electronic pen or a user's body part.

The communication interface 170 may include various communication circuitry and establish communication, for example, between the electronic device 101 and an external device (e.g., a first external electronic device 102, a second external electronic device 104, or a server 106). For example, the communication interface 170 may be connected to a network 162 through wireless or wired communication, and may communicate with an external device (e.g., the second external electronic device 104 or the server 106).

The wireless communication may include cellular communication using at least one of, for example, Long Term Evolution (LTE), LTE-Advance (LTE-A), Code Division Multiple Access (CDMA), Wideband CDMA (WCDMA), Universal Mobile Telecommunications System (UMTS), Wireless Broadband (WiBro), and Global System for Mobile Communications (GSM), or the like.

According to an example embodiment, the wireless communication may include, for example, short range communication 164. The short-range communication 164 may include at least one of, for example, Wi-Fi, Light Fidelity (Li-Fi), Wireless Gigabit alliance (WiGig), Bluetooth, Bluetooth Low Energy (BLE), Zigbee, Near Field Communication (NFC), magnetic secure transmission, Radio Frequency (RF), or a Body Area Network (BAN).

According to an example embodiment, the wireless communication may include Global Navigation Satellite System (GNSS). The GNSS may include, for example, Global Positioning System (GPS), Global Navigation satellite system (Glonass), Beidou Navigation satellite system (hereinafter, referred to as "Beidou") or Galileo, and the European global satellite-based navigation system. Hereinafter, in the present disclosure, the "GPS" may be interchangeably used with the "GNSS".

The wired communication may include, for example, at least one of a Universal Serial Bus (USB), a High Definition Multimedia Interface (HDMI), Recommended Standard 232 (RS-232), and a Plain Old Telephone Service (POTS).

The network 162 may include at least one of a telecommunication network such as a computer network (e.g., a LAN or a WAN), the Internet, and a telephone network.

Each of the first external electronic device 102 and second external electronic device 104 may be of a type identical to or different from that of the electronic device 101. According to an embodiment of the present disclosure, the server 106 may include a group of one or more servers. According to various embodiments of the present disclosure, all or some of the operations performed in the electronic device 101 may be executed in another electronic device or a plurality of electronic devices (e.g., the electronic devices 102 and 104 or the server 106). According to an embodiment of the present disclosure, when the electronic device 101 has to perform some functions or services automatically or in response to a request, the electronic device 101 may request another device (e.g., the electronic device 102 or 104 or the server 106) to execute at least some functions relating thereto instead of or in addition to autonomously performing the functions or services. Another electronic device (e.g., the electronic device 102 or 104, or the server 106) may execute the requested functions or the additional functions, and may deliver a result of the execution to the electronic device 101. The electronic device 101 may process the received result as it is or additionally, and may provide the requested functions or services. To this end, for example, cloud computing, distributed computing, or client-server computing technologies may be used.

Figure 2:
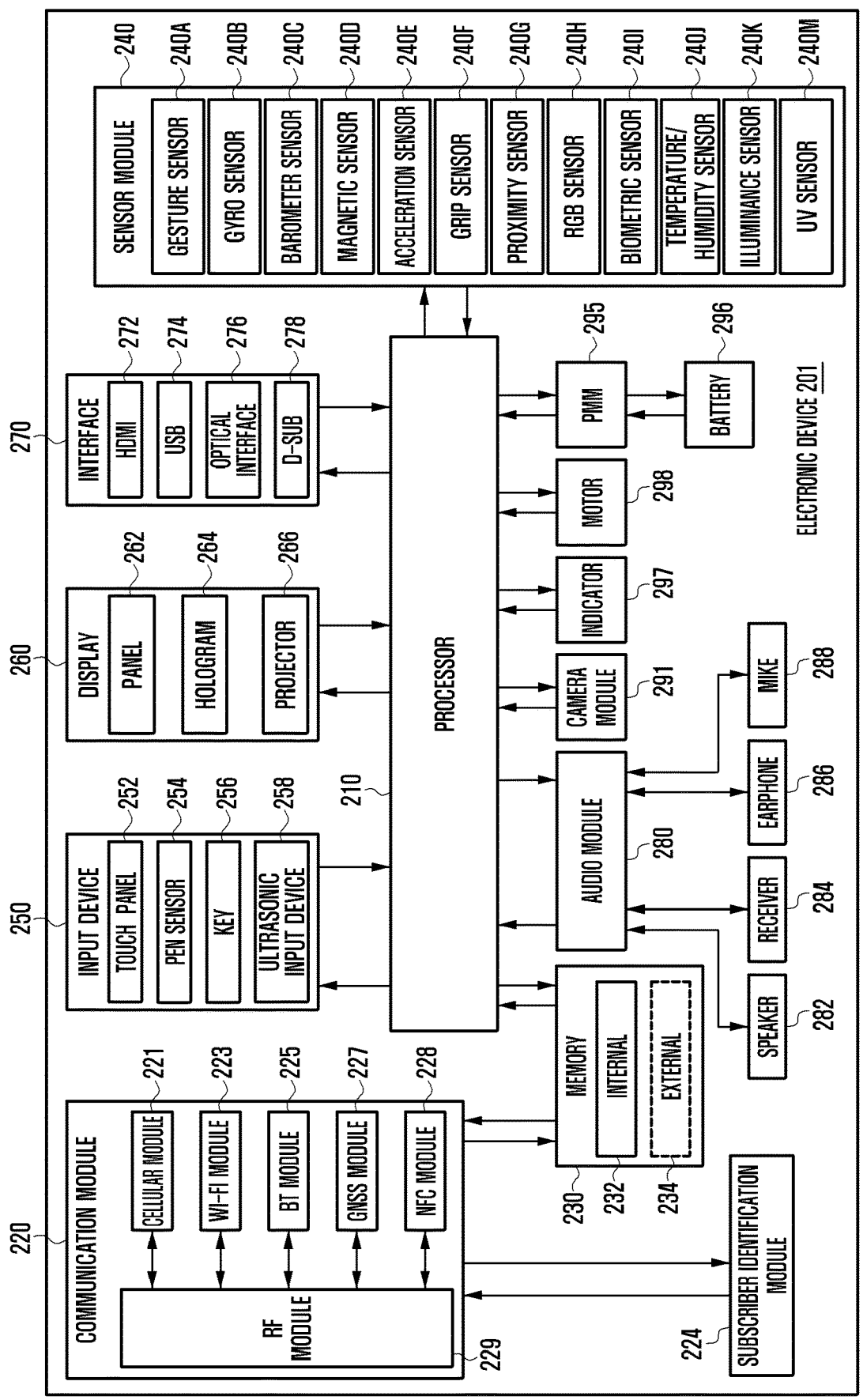
FIG. 2 is a block diagram illustrating the electronic device according to various embodiments of the present disclosure.

FIG. 2 is a block diagram illustrating an electronic device according to various embodiments of the present disclosure.

The electronic device 201 may include, for example, all or a part of the electronic device 101 shown in FIG. 1. The electronic device 201 may include one or more processors (e.g., including processing circuitry) 210 (e.g., Application Processors (AP)), a communication module (e.g., including communication circuitry) 220, a Subscriber Identification Module (SIM) 224, a memory 230, a sensor module 240, an input device (e.g., including input circuitry) 250, a display 260, an interface (e.g., including interface circuitry) 270, an audio module 280, a camera module 291, a power management module 295, a battery 296, an indicator 297, and a motor 298.

The processor 210 may include various processing circuitry and control a plurality of hardware or software components connected to the processor 210 by driving an operating system or an application program, and perform processing of various pieces of data and calculations. The processor 210 may be embodied as, for example, a System on Chip (SoC). According to an embodiment of the present disclosure, the processor 210 may further include a Graphic Processing Unit (GPU) and/or an image signal processor. The processor 210 may include at least some (for example, a cellular module 221) of the components illustrated in FIG. 2. The processor 210 may load, into a volatile memory, commands or data received from at least one (e.g., a non-volatile memory) of the other components and may process the loaded commands or data, and may store various data in a non-volatile memory.

The communication module 220 may have a configuration equal or similar to that of the communication interface 170 of FIG. 1. The communication module 220 may include various communication circuitry included in a variety of modules, such as, for example, and without limitation, a cellular module 221, a Wi-Fi module 223, a BT module 225, a GNSS module 227 (e.g., a GPS module 227, a Glonass module, a Beidou module, or a Galileo module), an NFC module 228, and/or a Radio Frequency (RF) module 229, or the like.

The cellular module 221, for example, may provide a voice call, a video call, a text message service, or an Internet service through a communication network. According to an embodiment of the present disclosure, the cellular module 221 may distinguish and authenticate the electronic device 201 in a communication network using the subscriber identification module 224 (for example, the SIM card). According to an embodiment of the present disclosure, the cellular module 221 may perform at least some of the functions that the processor 210 may provide. According to an embodiment of the present disclosure, the cellular module 221 may include a communication processor (CP).

According to an embodiment of the present disclosure, at least some (e.g., two or more) of the cellular module 221, the Wi-Fi module 223, the BT module 225, the GNSS module 227, and the NFC module 228 may be included in one Integrated Chip (IC) or IC package.

The RF module 229, for example, may transmit/receive a communication signal (e.g., an RF signal). The RF module 229 may include, for example, a transceiver, a Power Amplifier Module (PAM), a frequency filter, a Low Noise Amplifier (LNA), and an antenna. According to another embodiment of the present disclosure, at least one of the cellular module 221, the Wi-Fi module 223, the BT module 225, the GNSS module 227, and the NFC module 228 may transmit/receive an RF signal through a separate RF module.

The subscriber identification module 224 may include, for example, a card including a subscriber identity module and/or an embedded SIM (eSIM), and may contain unique identification information (e.g., an Integrated Circuit Card Identifier (ICCID)) or subscriber information (e.g., an International Mobile Subscriber Identity (IMSI)).

The memory 230 (e.g., the memory 130) may include, for example, an embedded memory 232 and/or an external memory 234. The embedded memory 232 may include at least one of a volatile memory (e.g., a Dynamic Random Access Memory (DRAM), a Static RAM (SRAM), a Synchronous Dynamic RAM (SDRAM), and the like) and a non-volatile memory (e.g., a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a flash memory (e.g., a NAND flash memory or a NOR flash memory), a hard disc drive, a Solid State Drive (SSD), and the like).

The external memory 234 may further include a flash drive, for example, a Compact Flash (CF), a Secure Digital (SD), a Micro Secure Digital (Micro-SD), a Mini Secure Digital (Mini-SD), an eXtreme Digital (xD), a MultiMediaCard (MMC), a memory stick, or the like. The external memory 234 may be functionally and/or physically connected to the electronic device 201 through various interfaces.

The sensor module 240, for example, may measure a physical quantity or detect an operation state of the electronic device 201, and may convert the measured or detected information into an electrical signal. The sensor module 240 may include, for example, at least one of a gesture sensor 240A, a gyro sensor 240B, an atmospheric pressure sensor (barometer) 240C, a magnetic sensor 240D, an acceleration sensor 240E, a grip sensor 240F, a proximity sensor 240G, a color sensor 240H (e.g., red, green, and blue (RGB) sensor), a biometric sensor (medical sensor) 2401, a temperature/humidity sensor 240J, an illuminance sensor 240K, and an Ultra Violet (UV) sensor 240M. Additionally, or alternatively, the sensor module 240 may include, for example, an E-nose sensor, an electromyography (EMG) sensor, an electroencephalogram (EEG) sensor, an electrocardiogram (ECG) sensor, an Infrared (IR) sensor, an iris scan sensor, and/or a finger scan sensor. The sensor module 240 may further include a control circuit for controlling one or more sensors included therein. According to an embodiment of the present disclosure, the electronic device 201 may further include a processor configured to control the sensor module 240, as a part of the processor 210 or separately from the processor 210, and may control the sensor module 240 while the processor 210 is in a sleep state.

The input device 250 may include various input circuitry, such as, for example, and without limitation, a touch panel 252, a (digital) pen sensor 254, a key 256, and/or an ultrasonic input device 258, or the like. The touch panel 252 may use, for example, at least one of a capacitive type, a resistive type, an infrared type, and an ultrasonic type. The touch panel 252 may further include a control circuit. The touch panel 252 may further include a tactile layer, and provide a tactile reaction to the user.

The (digital) pen sensor 254 may include, for example, a recognition sheet which is a part of the touch panel or is separated from the touch panel. The key 256 may include, for example, a physical button, an optical key or a keypad. The ultrasonic input device 258 may detect, through a microphone (e.g., the microphone 288), ultrasonic waves generated by an input tool, and identify data corresponding to the detected ultrasonic waves.

The display 260 (e.g., the display 160) may include a panel 262, a hologram device 264, a projector 266, and/or a control circuit for controlling the aforementioned elements. The panel 262 may be implemented to be flexible, transparent, or wearable. The panel 262 and the touch panel 252 may be integrated into one or more modules. According to an example embodiment, the panel 262 may include a pressure sensor (or a force sensor) for measuring an intensity of pressure on a user's touch. The pressure sensor may be integrated into the touch panel 252 or may be implemented with one or more sensors separate from the touch panel 252. The hologram device 264 may display a stereoscopic image in a space using a light interference phenomenon. The projector 266 may project light onto a screen so as to display an image. The screen may be arranged inside or outside the electronic device 201.

The interface 270 may include various interface circuitry, such as, for example, and without limitation, a High-Definition Multimedia Interface (HDMI) 272, a Universal Serial Bus (USB) 274, an optical interface 276, and/or a D-subminiature (D-sub) 278, or the like. The interface 270 may be included in, for example, the communication interface 170 illustrated in FIG. 1. Additionally or alternatively, the interface 270 may include, for example, a Mobile High-definition Link (MHL) interface, a Secure Digital (SD) card/MultiMedia Card (MMC) interface, or an Infrared Data Association (IrDA) standard interface.

The audio module 280, for example, may bilaterally convert a sound and an electrical signal. At least some components of the audio module 280 may be included in, for example, the input/output interface 150 illustrated in FIG. 1. The audio module 280 may process voice information input or output through, for example, a speaker 282, a receiver 284, earphones 286, or the microphone 288.

The camera module 291 is, for example, a device which may photograph a still image and a video. According to an embodiment of the present disclosure, the camera module 291 may include one or more image sensors (e.g., a front sensor or a back sensor), a lens, an Image Signal Processor (ISP) or a flash (e.g., LED or xenon lamp).

The power management module 295 may manage, for example, power of the electronic device 201. According to an embodiment of the present disclosure, the power management module 295 may include a Power Management Integrated Circuit (PMIC), a charger Integrated Circuit (IC), or a battery gauge (or a fuel gauge). The PMIC may use a wired and/or wireless charging method. Examples of the wireless charging method may include, for example, a magnetic resonance method, a magnetic induction method, an electromagnetic wave method, and the like. Additional circuits (e.g., a coil loop, a resonance circuit, a rectifier, etc.) for wireless charging may be further included. The battery gauge may measure, for example, a residual quantity of the battery 296, and a voltage, a current, or a temperature while charging. The battery 296 may include, for example, a rechargeable battery and/or a solar battery.

The indicator 297 may display a specific state of the electronic device 201 or a portion thereof (e.g., a processor 210), such as a booting state, a message state, a charging state, and the like. The motor 298 may convert an electrical signal into a mechanical vibration and may generate vibration, a haptic effect, and the like.

For example, the electronic device 201 may include a mobile TV supporting device (for example, a GPU) for processing media data according to the standards of digital multimedia broadcasting (DMB), digital video broadcasting (DVB), MediaFlo™, or the like.

Each of the elements described in the present disclosure may be configured with one or more components, and the names of the elements may be changed according to the type of the electronic device. According to various embodiments, some elements of the electronic device (for example, the electronic device 101, 201) may be omitted or other additional elements may be added. Furthermore, some of the elements may be combined with each other so as to form one entity, and the functions of the elements may be performed in the same manner as before being combined.

Figure 3:
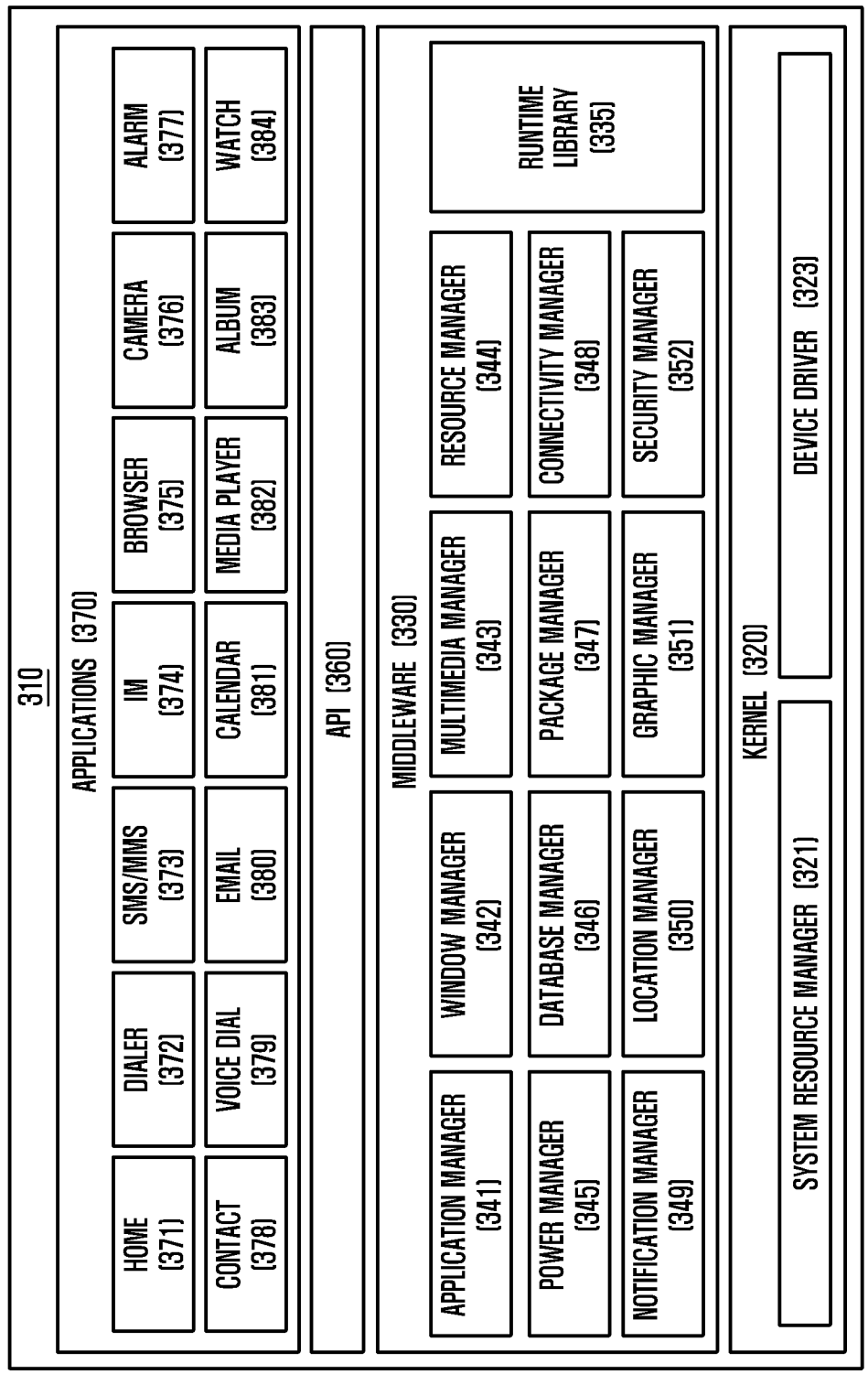
FIG. 3 is a block diagram illustrating a program module according to various embodiments.

FIG. 3 is a block diagram illustrating a program module according to various embodiments of the present disclosure.

According to an embodiment of the present disclosure, the program module 310 (e.g., the program 140) may include an Operating System (OS) for controlling resources related to the electronic device (e.g., the electronic device 101) and/or various applications (e.g., the application programs 147) executed in the operating system. The operating system may be, for example, Android™ iOS™, Windows™, Symbian™, Tizen™, Bada™, or the like.

The program module 310 may include a kernel 320, middleware 330, an API 360, and/or applications 370. At least some of the program module 310 may be preloaded on an electronic device, or may be downloaded from an external electronic device (e.g., the electronic device 102 or 104, or the server 106).

The kernel 320 (e.g., the kernel 141) may include, for example, a system resource manager 321 and/or a device driver 323. The system resource manager 321 may control, allocate, or collect system resources. According to an embodiment of the present disclosure, the system resource manager 321 may include a process management unit, a memory management unit, a file system management unit, and the like. The device driver 323 may include, for example, a display driver, a camera driver, a Bluetooth driver, a shared memory driver, a USB driver, a keypad driver, a Wi-Fi driver, an audio driver, or an Inter-Process Communication (IPC) driver.

For example, the middleware 330 may provide a function used in common by the applications 370, or may provide various functions to the applications 370 through the API 360 so as to enable the applications 370 to efficiently use the limited system resources in the electronic device. According to an embodiment of the present disclosure, the middleware 330 (e.g., the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module that a compiler uses in order to add a new function through a programming language while an application 370 is being executed. The runtime library 335 may perform input/output management, memory management, the functionality for an arithmetic function, or the like.

The application manager 341 may manage, for example, a life cycle of at least one of the applications 370. The window manager 342 may manage Graphical User Interface (GUI) resources used by a screen. The multimedia manager 343 may recognize a format used for reproduction of various media files, and may perform encoding or decoding of a media file by using a codec suitable for the corresponding format. The resource manager 344 may manage resources of a source code, a memory, and a storage space of at least one of the applications 370.

The power manager 345 may manage, for example, battery capacity, temperature, or power, and may determine or provide power information used for the operation of the electronic device (101, 201) based on corresponding information. According to an embodiment, the power manager 345 may operate in conjunction with a Basic Input/Output System (BIOS).

The database manager 346 may generate, search for, and/or change a database to be used by at least one of the applications 370. The package manager 347 may manage installation or an update of an application distributed in a form of a package file.

The connectivity manager 348 may manage wireless connectivity such as Wi-Fi or Bluetooth. The notification manager 349 may display or notify of an event such as an arrival message, promise, proximity notification, and the like in such a way that does not disturb a user. The location manager 350 may manage location information of an electronic device. The graphic manager 351 may manage a graphic effect which will be provided to a user, or a user interface related to the graphic effect. The security manager 352 may provide all security functions used for system security, user authentication, or the like. According to an embodiment of the present disclosure, when the electronic device (e.g., the electronic device 101) has a telephone call function, the middleware 330 may further include a telephony manager for managing a voice call function or a video call function of the electronic device.

The middleware 330 may include a middleware module that forms a combination of various functions of the above-described components. The middleware 330 may provide a module specialized for each type of OS in order to provide a differentiated function. Further, the middleware 330 may dynamically remove some of the existing components or add new components.

The API 360 (e.g., the API 145) is, for example, a set of API programming functions, and may be provided with a different configuration according to an OS. For example, in the case of Android or iOS, one API set may be provided for each platform. In the case of Tizen, two or more API sets may be provided for each platform.

The applications 370 (e.g., the application programs 147) may include, for example, one or more applications which may provide functions such as a home 371, a dialer 372, an SMS/MMS 373, an Instant Message (IM) 374, a browser 375, a camera 376, an alarm 377, contacts 378, a voice dial 379, an email 380, a calendar 381, a media player 382, an album 383, and a watch 384. The applications 370 may also include various other applications (not shown), including, for example, a health care (e.g., measuring exercise quantity or blood sugar), or environment information (e.g., providing atmospheric pressure, humidity, or temperature information) providing application, a payment application, a card registration application, a card company application, or a bank application.

According to an embodiment of the present disclosure, the applications 370 may include an application (hereinafter, referred to as an "information exchange application" for convenience of description) that supports exchanging information between the electronic device (e.g., the electronic device 101) and an external electronic device (e.g., the electronic device 102 or 104). The information exchange application may include, for example, a notification relay application for transferring specific information to an external electronic device or a device management application for managing an external electronic device.

For example, the notification relay application may include a function of transferring, to the external electronic device (e.g., the electronic device 102 or 104), notification information generated from other applications of the electronic device 101 (e.g., an SMS/MMS application, an e-mail application, a health management application, or an environmental information application). Further, the notification relay application may receive notification information from, for example, an external electronic device and provide the received notification information to a user.

The device management application may manage (e.g., install, delete, or update), for example, at least one function of an external electronic device (e.g., the electronic device 102 or 104) communicating with the electronic device (e.g., a function of turning on/off the external electronic device itself (or some components) or a function of adjusting the brightness (or a resolution) of the display), applications operating in the external electronic device, and services provided by the external electronic device (e.g., a call service or a message service).

According to an embodiment of the present disclosure, the applications 370 may include applications (e.g., a health care application of a mobile medical appliance or the like) designated according to an external electronic device (e.g., attributes of the electronic device 102 or 104). According to an embodiment of the present disclosure, the applications 370 may include an application received from an external electronic device (e.g., the server 106, or the electronic device 102 or 104). According to an embodiment of the present disclosure, the applications 370 may include a preloaded application or a third party application that may be downloaded from a server. The names of the components of the program module 310 of the illustrated embodiment of the present disclosure may change according to the type of operating system.

According to various embodiments, at least a part of the programming module 310 may be implemented in software, firmware, hardware, or a combination of two or more thereof. At least some of the program module 310 may be implemented (e.g., executed) by, for example, the processor (e.g., the processor 210). At least some of the program module 310 may include, for example, a module, a program, a routine, a set of instructions, and/or a process for performing one or more functions.

FIGS. 4A, 4B, 4C, and 4D are flowcharts illustrating a method for sharing information of an electronic device according to various embodiments of the present disclosure.

According to various embodiments, an electronic device and an external electronic device communicating (e.g., via a short range communication connection) with the electronic device may each include the whole or a portion of the electronic device 101 shown in FIG. 1.

Figure 4A:
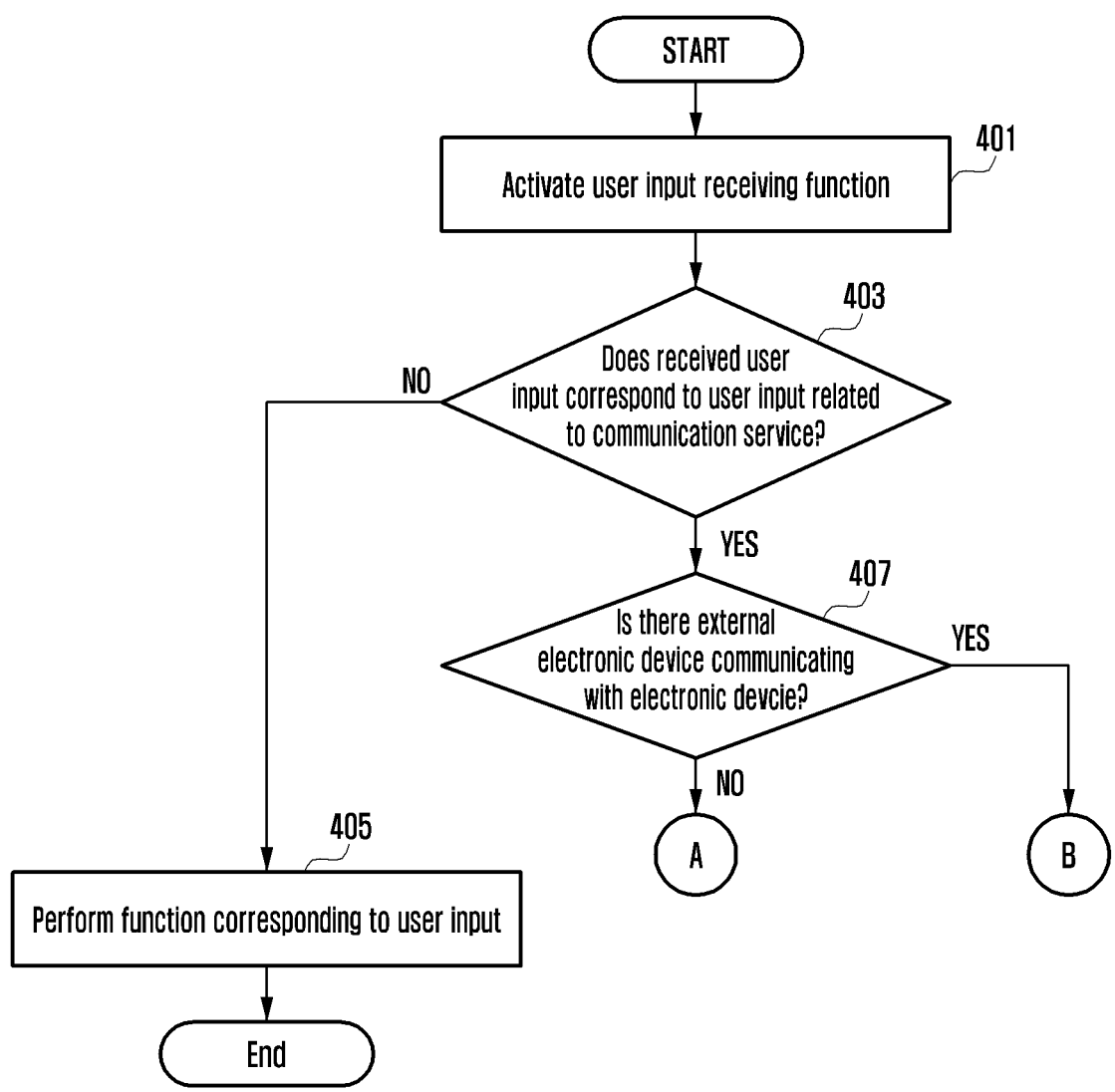
FIGS. 4A, 4B, 4C, and 4D are flowcharts illustrating a method for sharing information of an electronic device according to various embodiments of the present disclosure.

Referring to FIG. 4A, at operation 401, an electronic device (e.g., processor 120 of an electronic device including a processing circuit) may activate a function for receiving a user input. Here, the user input may refer, for example, to an input related to the execution of various applications included in the electronic device. At this time, for example, the electronic device may execute an application that provides a function of receiving a user input when the function of receiving the user input is activated.

For example, the electronic device can activate the function of receiving the user input when an input is pressed that presses a pre-set key to activate the function of receiving the user input. For example, the electronic device can activate the function of receiving the user input when receiving a pre-set voice to activate the function of receiving the user input. For example, when a voice command preset to activate the function of receiving the user input is "High Galaxy", if a voice including the "High Galaxy" is received, the electronic device may activate the function of receiving the user input.

According to various embodiments, the electronic device may recognize a voice using a natural language processing (NLP) technology and identify words included in the voice. The natural language processing technology may include, for example, a technology of mechanically analyzing a human language phenomenon and allowing an electronic device to recognize the meaning of the language phenomenon. Further, for example, the electronic device may determine whether a word identified from the voice corresponds to a command related to the performance of the function. For example, the electronic device may display, via the display a screen (or application screen) related to an application providing the function of receiving the user input when the function of receiving the user input is activated.

According to various embodiments, at operation 403, the electronic device may receive the user input and determine whether the received user input is a user input for execution of an application related to a communication service. Here, the application related to the communication service may refer, for example, to an application related to at least one of a voice call, a video call, a voice message, a text message, a messenger, and an e-mail.

For example, the electronic device may receive the user's voice when the function of receiving the user input is activated. For example, when a voice corresponding to "call me" is received, the electronic device may determine that the user input for execution of an application capable of providing a voice call service has been received. For example, when a voice corresponding to "music reproduction" is received, the electronic device may determine that the user input for execution of an application capable of reproducing the music stored in the electronic device has been received. According to an example embodiment, when a user's voice is input as a user input, the electronic device may display, as a text, syllables and words included in the input user's voice on the screen.

The electronic device may receive, as a user input for execution of an application, a text input by a key (e.g., a physical button, a virtual button provided in a user interface, or the like) when the function of receiving the user input is activated. For example, when the function of receiving the user input is activated, the electronic device may display a virtual button for inputting characters on the display. At this time, when the user inputs a text corresponding to "text message" using the virtual button, the electronic device may determine that a user input for execution of an application capable of providing the text message service is received.

According to various embodiments, at operation 405, the electronic device may perform a function corresponding to a received user input if the received user input is not the user input for the execution of the application related to the communication service.

According to various embodiments, at operation 407, the electronic device may determine whether there is an external electronic device communicating with the electronic device if the received user input is the user input for the execution of the application related to the communication service. According to an example embodiment, when there is the communicating external electronic device, the electronic device may be driven as a master device, and the external electronic device may be driven as a slave device. Here, the master device may refer, for example, to a device that serves as a subject of performing the function when performing the function of the electronic device, and may control the slave device. In addition, the slave device may refer, for example, to a device that plays a dependent role of performing the function when performing the function of the electronic device, and may mainly perform the function according to the instruction of the master device.

Figure 4B:
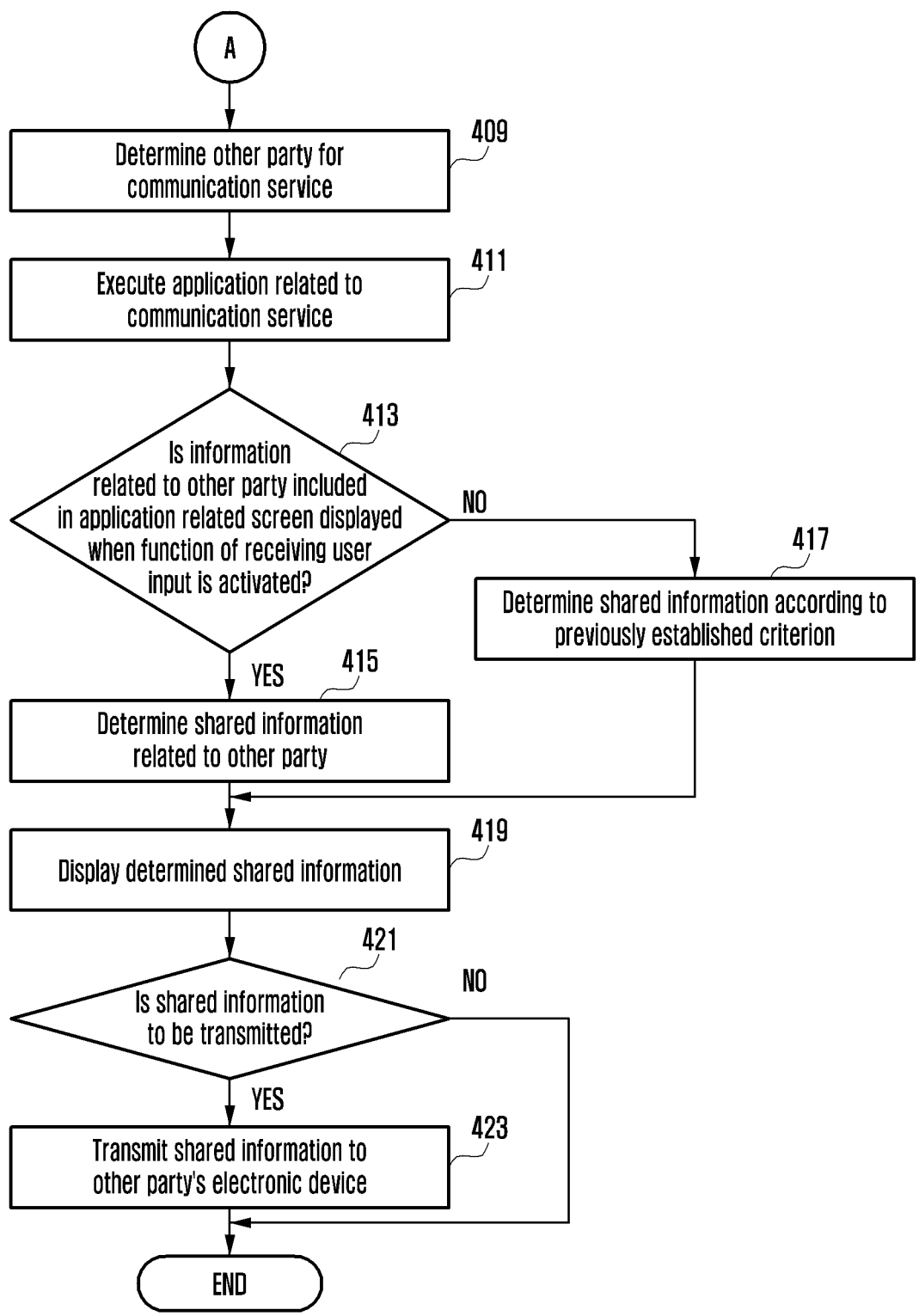

Referring to FIG. 4B, if, at operation 407 if FIG. 4A, it is determined that there is no other electronic device communicating with the electronic device, (operation 407:N), at operation 409, the electronic device (e.g., processor 120 of an electronic device, including a processing circuit) may determine the other party (e.g., counterpart electronic device) of a communication service based on the received user input when there is no external electronic device communicating with the electronic device. For example, the electronic device may determine the other party of the communication service as "Jenny" when receiving a voice "call Jenny".

According to various embodiments, in 411 operation, the electronic device may execute the application related to the communication service based on the received user input.

According to various embodiments, at operation 413, the electronic device may identify (determine) an application executed by the electronic device when the function of receiving input is activated. For example, the electronic device may store information (e.g., type, name, execution information, etc.) on the application in the memory, and identify the application executed by the electronic device based on the information on the application stored in the memory when the function of receiving the user input is activated.

For example, the electronic device may identify the information on the screen related to the application displayed on the display when the function of receiving the user input is activated. For example, the electronic device may store information on a screen related to an application in a memory, and may identify the information on the screen related to the application displayed on the display based on the information on the screen related to the application stored in the memory when a function of receiving a user input is activated.

For example, the electronic device may identify (determine) whether the information related to the other party of the communication service is displayed on the screen related to the application displayed on the display when the function of receiving the user input is activated.

The electronic device may identify (determine) whether a user's schedule related to the other party of the communication service is displayed on the screen related to the schedule application in the case in which the screen displayed on the display is a screen associate with a schedule application which may manage a user's schedule when the function of receiving user input is activated. For example, the electronic device may identify (determine) whether the user's schedule including information (e.g., name, telephone number, etc.) related to the other party "Jenny" is displayed on the screen related to the schedule application.

The electronic device may identify (determine) whether a user's schedule related to the other party of the communication service is displayed on the screen related to the schedule application in the case in which the screen displayed on the display is a screen associate with a schedule application which may manage a user's schedule when the function of receiving user input is activated. For example, the electronic device may identify (determine) whether a photograph displayed on the screen related to a photo management application is related to contact information (e.g., a thumbnail image) of "Jenny" stored in the electronic device. For example, the electronic device may identify whether the information (e.g., a tag) on the photograph displayed on the screen related to the photograph management application includes the other party "Jenny".

According to various embodiments, at operation 415, the electronic device may determine the information related to the other party of the communication service displayed on the screen as the shared information to be shared with the other party, in the case in which the information related to the other party of the communication service is displayed on the screen displayed on the display when the function of receiving the user input is activated.

For example the electronic device may determine the information (e.g., schedule contents, time, location, etc.) on the user's schedule related to "Jenny" displayed on the screen of the schedule application as the shared information. At this time, when a user's schedule related to "Jenny" displayed on the screen of the schedule application is two or more, the information on at least two user's schedules related to "Jenny" may also be determined as the shared information.

According to various embodiments, in the operation 417, the electronic device may determine, as the shared information, at least one information displayed on the screen related to the application displayed when the function of receiving the user input is activated according to the predefined criterion, in the case in which the information related to the other party of the communication service is not displayed on the screen related to the application displayed on the display when the function of receiving the user input is activated. According to an example embodiment, a criterion for identifying at least one information may be, for example, arbitrarily set by a user in an electronic device, and may be set individually for each application.

The electronic device may determine, as the shared information, at least one information displayed on the screen related to the application displayed on the display based on, for example, at least one of the date information, the time information and the position information when the function of receiving the user input is activated. For example, when the schedule related to "John" determined as the other party is not displayed on the screen of the schedule application, the electronic device may compare the date information, the time information and/or the location information related to the schedule displayed on the screen of the schedule application with the date, time, and/or location information of the electronic device where the function of receiving the user input is activated in the electronic device, and may determine, as the shared information, the information on at least one schedule based on the comparison result.

For example, the electronic device may identify uniform resource locator (URL) information corresponding to the screen related to the application displayed on the display when the function of receiving the user input is activated and identify an image corresponding to the screen related to the application displayed on the display when the function of receiving the user input is activated, in the case in which the screen related to the application displayed on the display is a screen related to an Internet browser application when the function of receiving the user input is activated.

For example, the electronic device may identify that the process of sharing the information with the other party, in the case in which the information related to the other party of the communication service is not displayed on the screen related to the application displayed on the display when the function of receiving the user input is activated.

According to various embodiments, at operation 419, the electronic device may display the information, which is determined as the shared information at operation 415 or 417, on the display.

For example, the electronic device may display the information determined as the shared information on the application screen related to the voice call displayed on the display, if the communication service is the voice call. For example, when the application screen related to the voice call is not displayed on the display while the user is making the voice call with the other party, the electronic device may display the information determined as the shared information on the voice call termination screen displayed on the display after the user's voice call is terminated. For example, when the application screen related to the voice call is not displayed on the display while the user is making the voice call with the other party, the electronic device may display the information determined as the shared information on the voice call screen displayed on the display while the voice call service is performed. For example, the electronic device may display information determined as shared information on an application screen related to a text message displayed on the display, when the communication service is the text message.

For example, the electronic device may also output the information determined as shared information through an audio module. For example, when the communication service is the text message, the electronic device may output through the audio module a voice signal which notifies a user that there is the information related to the other party, who is a target to which the text message is to be transmitted.

According to various embodiments, at operation 421, the electronic device may determine whether to transmit the information determined as the shared information to the other party's electronic device. For example, the electronic device may display on the display a user interface that enables a user to select whether or not to transmit the information related to the other party, and may determine whether to transmit the information related to the other party based on the user input for the user interface. For example, when the electronic device receives the user input that grants the transmission of the information related to the other party through the user interface displayed on the display, the electronic device may determine that the information related to the other party is transmitted to the other party's electronic device. For example, the electronic device may receive the user's voice that determines whether to transmit the information related to the other party. For example, when a voice "not transmitted" is received, the electronic device may determine that the transmission of the information related to the other party to the other party's electronic device is rejected.

According to various embodiments, when the electronic device is determined as transmitting the information determined as the shared information to the other party's electronic device at operation 421, at operation 423, the electronic device may transmit the information determined as the shared information to the other party's electronic device. For example, the electronic device may transmit the information to the other party's electronic device after the user's voice call is terminated. For example, the electronic device may transmit the information to the other party's electronic device while the user is making the voice call with the other party. For example, the electronic device may transmit the text message including the information determined as the shared information to the other party's electronic device.

Figure 4C:
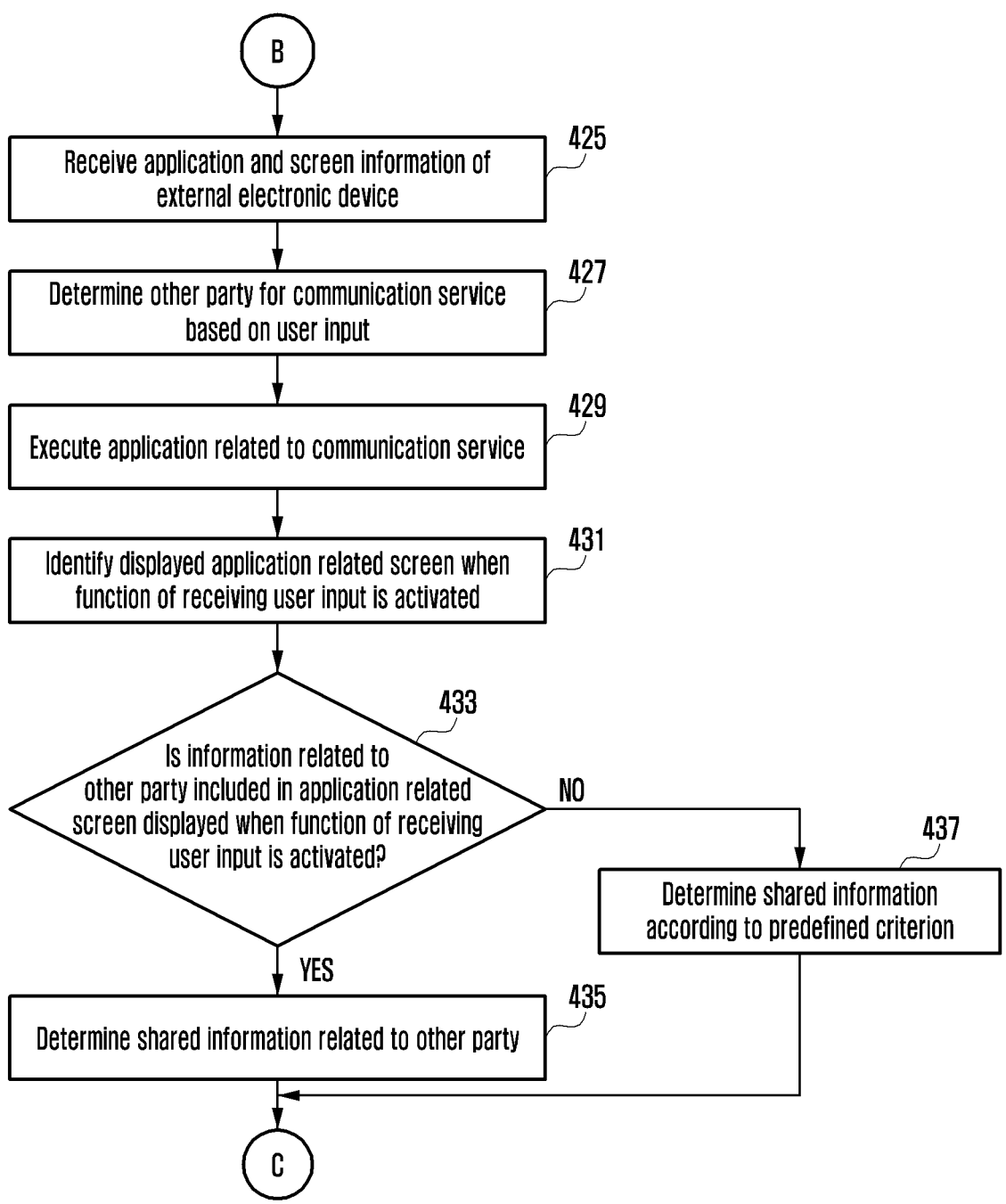

Referring to FIG. 4C, at operation 425, the electronic device (e.g., the processor 120 of the electronic device including the processing circuit) may request the information on the application executed by the external electronic device and the information on the screen output through the display of the external electronic device to the external electronic device and may receive the information on the application and the information on the screen from the external electronic device when there is the external electronic device communicating with the electronic device (see, e.g., FIG. 4A, operation 407:Y). For example, the electronic device may periodically receive the information on the application executed by the external electronic device and/or the information on the screen output through the display of the external electronic device from the external electronic device before the operation 401. For example, the electronic device may store the information on the application received from the external electronic device and the information on the screen in the memory.

According to various embodiments, at operation 427, the electronic device may determine the other party of the communication service based on the received user input.

According to various embodiments, at operation 429, the electronic device may execute the application related to the communication service based on the received user input.

According to various embodiments, at operation 431, the electronic device may identify the application executed by the electronic device and the application executed by the external electronic device when the function of receiving input is activated. For example, the electronic device may identify the application executed by the electronic device or the external electronic device based on the information of the application stored in the memory when the function of receiving the user input is activated. For example, the electronic device may identify the application executed when the function of receiving the user input is activated based on the information (e.g., time when the user input for performing the function of the application is received) on the time when the function related to the application is performed by the electronic device or the external electronic device.

According to various embodiments, at operation 433, the electronic device may identify (determine) the information on the screen related to the application displayed on the electronic device or the external electronic device when the function of receiving input is activated. For example, the electronic device may identify the information on the screen related to the application displayed when the function of receiving the user input is activated based on the information on the screen related to the application of the electronic device or the external electronic device stored in the memory. For example, the electronic device may identify whether the information related to the other party of the communication service is displayed on the screen related to the application displayed when the function of receiving the user input is activated.

According to various embodiments, at operation 435, the electronic device may determine as the shared information the information related to the other party of the communication service displayed on the screen, in the case in which the information related to the other party of the communication service is displayed on the screen related to the application displayed when the function of receiving the user input is activated.

According to various embodiments, at operation 437, the electronic device may determine, as the shared information, at least one information displayed on the screen related to the application displayed when the function of receiving the user input is activated according to the predefined criterion, in the case in which the information related to the other party of the communication service is not displayed on the screen related to the application displayed when the function of receiving the user input is activated. The criterion for identifying at least one information may be, for example, arbitrarily set by a user in an electronic device, and may be set individually for each application. For example, the electronic device may identify that the process of sharing the information with the other party, in the case in which the information related to the other party of the communication service is not displayed on the screen related to the application displayed when the function of receiving the user input is activated.

Figure 4D:
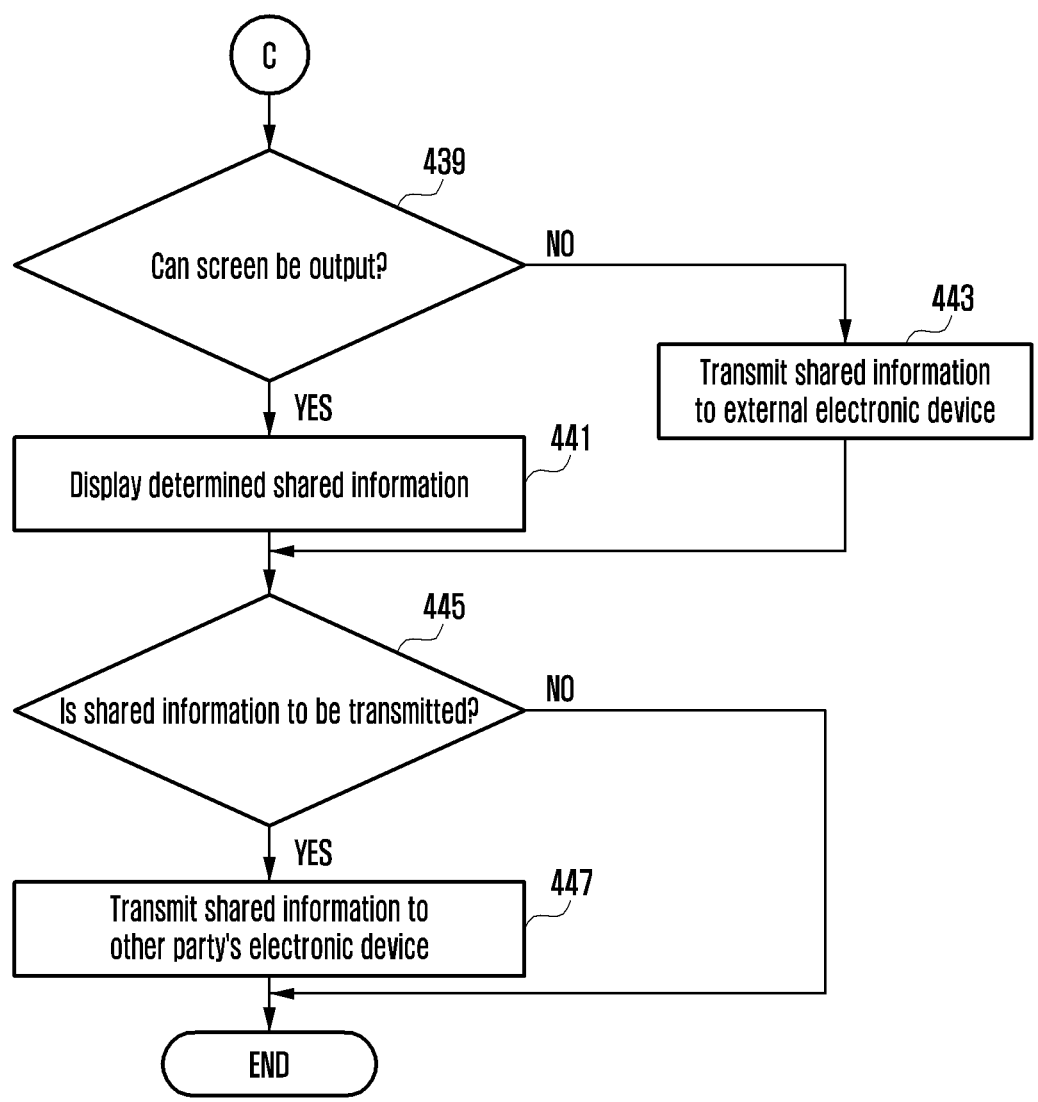

Referring to FIG. 4D, at operation 439, the electronic device (e.g., processor 120 of an electronic device including a processing circuit) may determine whether to output the screen through the display. For example, when the application screen related to the voice call is not displayed on the display of the electronic device while the user is making the voice call with the other party, the electronic device may determine that the screen may not be output through the display. According to an example embodiment, when the communication service is the text message, the electronic device may determine that the screen may be output through the display.

According to various embodiments, at operation 441, the electronic device may display the information determined as the shared information at operation 435 or operation 437 on the display, if it is determined that the screen may be output through the display at operation 439. When the application screen related to the voice call is not displayed on the display while the user is making the voice call with the other party, the electronic device may display the information determined as the shared information on the voice call screen displayed on the display while the voice call service is performed. For example, the electronic device may display information determined as shared information on an application screen related to a text message displayed on the display, when the communication service is the text message.

According to various embodiments, at operation 443, the electronic device may transmit the information determined as the shared information at operation 435 or operation 437 to the external electronic device, if it is determined that the screen may not be output through the display at operation 439. For example, the electronic device may transmit a command to control to display the information determined as the shared information on the display of the external electronic device, to the external electronic device. For example, the electronic device may identify the size of the display of the external electronic device, and may determine the information to be transmitted to the external electronic device based on the size of the display of the external electronic device. For example, if it is determined that the size of the display of the external electronic device is larger than a certain size, the electronic device may retrieve information related to the information (e.g., a photograph related to "Jenny") determined as the shared information in memory, and may transmit the associated information retrieved from the memory to the external electronic device together with the information determined as the shared information. According to an example embodiment, if it is determined that the size of the display of the external electronic device is smaller than a certain size, only the information determined as the shared information may be transmitted to the external electronic device.

According to various embodiments, at operation 445, the electronic device may determine whether to transmit the information determined as the shared information to the other party's electronic device. For example, if the information determined as shared information is displayed on the display of the electronic device, the electronic device may display the user interface, which can select whether to transmit the information determined as the shared information, on the display and determine whether to transmit the information determined as the shared information based on the user input for the user interface.

For example, if the information determined as the shared information at operation 443 is transmitted to the external electronic device, the electronic device may also transmit a command to control to display the user interface, which can select whether to transmit the information determined as the shared information, on the display of the external electronic device. For example, the electronic device may receive a response signal indicating whether to transmit the information determined as the shared information from the external electronic device, and may determine whether to transmit the information determined as the shared information based on the received response signal.

According to various embodiments, at operation 447, when the electronic device is determined as transmitting the information determined as the shared information to the other party's electronic device, the electronic device may transmit the information determined as the shared information to the other party's electronic device.

Although not shown in FIG. 4D, the electronic device may also transmit the termination command for the function related to the communication service to the external electronic device, for example, if it is determined whether or not to transmit the information determined as the shared information.

FIGS. 5A, 5B, 5C, and 5D are diagrams illustrating examples of performing a function of sharing the information on the user's schedule according to various embodiments of the present disclosure.

Figure 5A:
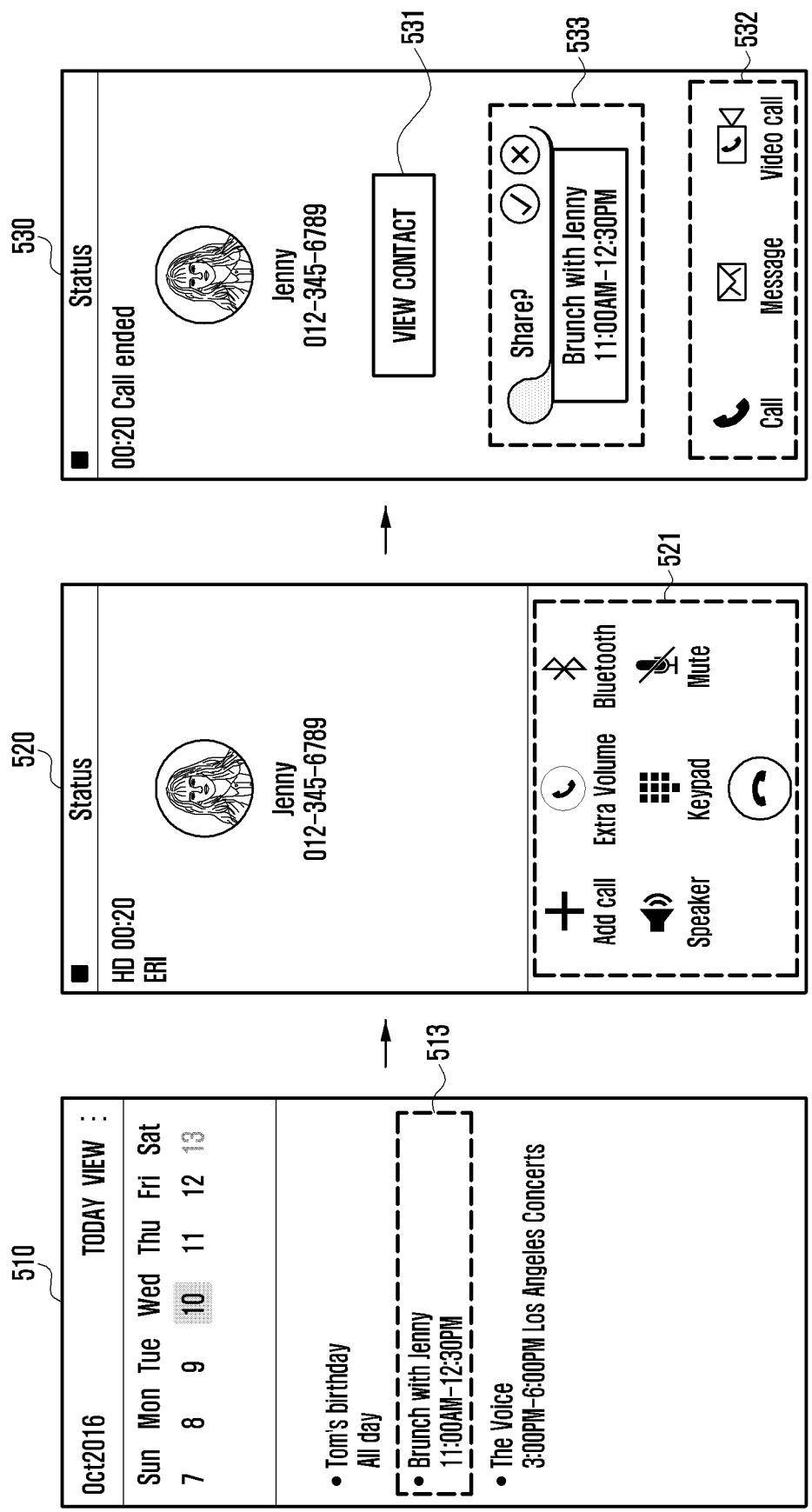
FIG. 5A is a diagram illustrating an example of performing a function of sharing schedule information related to a call partner after a call ends according to various embodiments of the present disclosure.
Figure 5B:
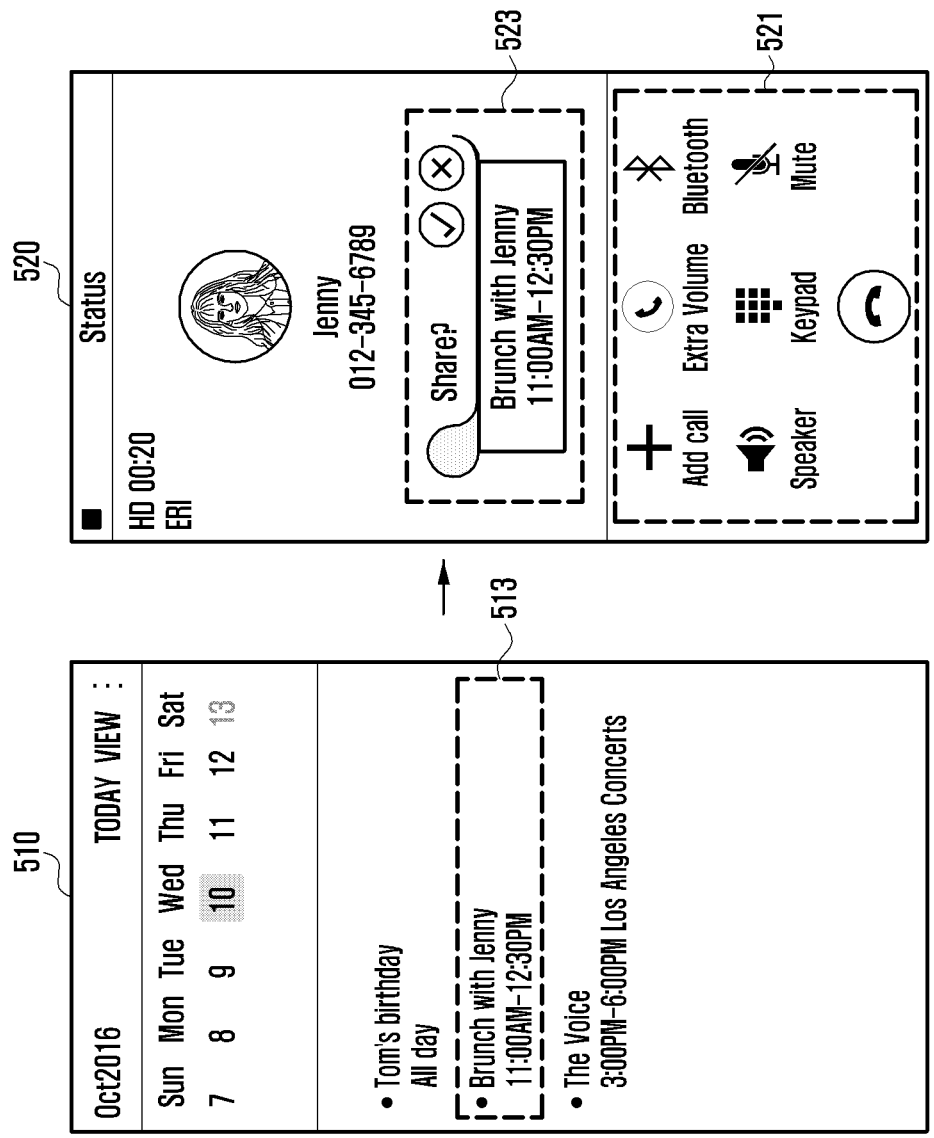
FIG. 5B is a diagram illustrating an example of performing a function of sharing schedule information related to a call partner during a call ends according to various embodiments of the present disclosure.
Figure 5C:
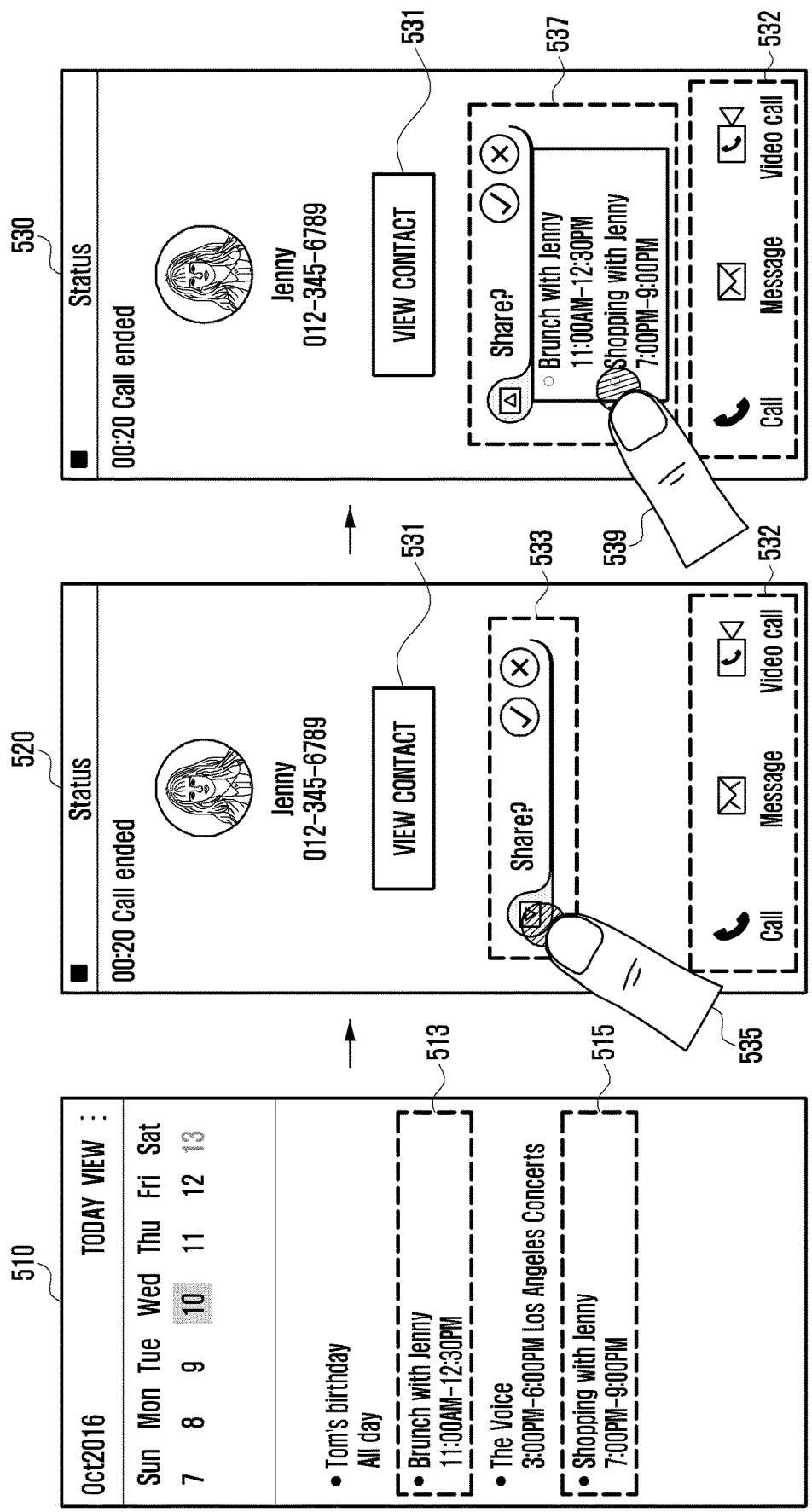
FIG. 5C is a diagram illustrating an example of performing a function of sharing a plurality of schedule information related to a call partner after a call ends according to various embodiments of the present disclosure.
Figure 5D:
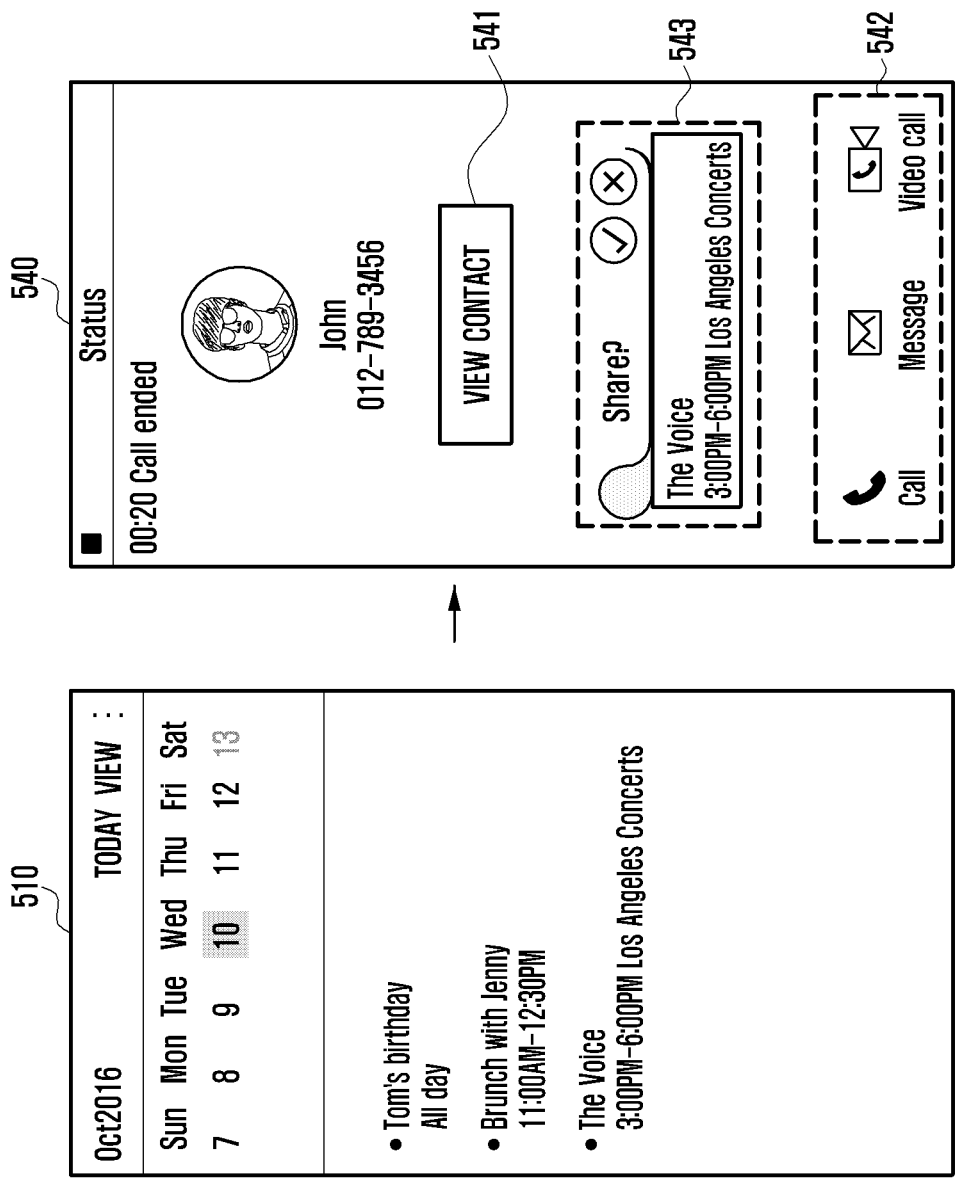
FIG. 5D is a diagram illustrating an example of performing a function of sharing schedule information which is not related to a call partner after a call ends according to various embodiments of the present disclosure.

FIG. 5A is a diagram illustrating an example of performing a function of sharing schedule information related to a call partner after a call is terminated according to various embodiments of the present disclosure, FIG. 5B is a diagram illustrating an example of performing a function of sharing schedule information related to a call partner during a call ends according to various embodiments of the present disclosure, FIG. 5C is a diagram illustrating an example of performing a function of sharing a plurality of schedule information related to a call partner after a call ends according to various embodiments of the present disclosure, and FIG. 5D is a diagram illustrating an example of performing a function of displaying schedule information which is not related to a call partner after a call ends according to various embodiments of the present disclosure.

Referring to FIG. 5A, for example, the electronic device may activate a function to receive a user input in a state in which a schedule application screen 510 is displayed on the display. For example, the electronic device may receive the preset voice command "Hi-Galaxy" and activate the function to receive the user input. For example, the electronic device may determine the other party of the voice call to be "Jenny" and perform the voice call service by executing the application related to the voice call when the voice "call Jenny" is received while the function of receiving the user input is activated.

For example, the electronic device may receive, for example, a voice command, which executes the application related to the preset voice command and voice call, at one time to activate the function of receiving the user input. For example, the electronic device may determine the other party of the voice call as "Jenny" and execute the application related to the voice call when receiving the voice "High Galaxy, call Jenny". The electronic device may identify that a user's schedule 513 related to "Jenny" is displayed on a schedule application screen 510 displayed on the display when the function of receiving the user input is activated.

For example, the electronic device may display an application screen 520 related to performing a voice call on the display. For example, the electronic device may not display an application screen 520 related to performing the voice call on the display when the other party receives the voice call or during an incoming call. For example, the electronic device may display an application screen 520 related to performing a voice call that includes a user interface 521 related to performing the voice call. For example, if the application screen 520 related to performing the voice call is not displayed on the display while the user is making the voice call with the other party, the electronic device may display a user interface 533 capable of selecting whether to transmit the user's schedule related to "Jenny" on a voice call termination screen 530 displayed on the display after the voice call of the user is terminated. For example, the electronic device includes a user interface 531 capable of identifying contact information on a voice call counterpart after the termination of the voice call and/or a voice call termination screen 530 including a user interface 532 related to performing the function after the voice call termination.

Referring to FIG. 5B, for example, the electronic device may activate a function to receive a user input in a state in which a schedule application screen 510 is displayed on the display. The electronic device may determine the other party of the voice call to be "Jenny" and perform the voice call service by executing the application related to the voice call, when the voice "call Jenny" is received while the function of receiving the user input is activated. The electronic device may identify that a user's schedule 513 related to "Jenny" is displayed on a schedule application screen 510 displayed on the display when the function of receiving the user input is activated.

For example, if the application screen 520 related to the voice call is displayed on the display while the user is making the voice call with the other party, the electronic device may display a user interface 523 which may select the information on the user's schedule related to "Jenny" and whether to transmit the information on a voice call termination screen 520 displayed on the display while the voice call service is received.

For example, the electronic device may display an application screen 520 related to performing a voice call that includes a user interface 521 related to performing the voice call.

Referring to FIG. 5C, for example, the electronic device may activate a function to receive a user input in a state in which a schedule application screen 510 is displayed on the display. The electronic device may determine the other party of the voice call to be "Jenny" and perform the voice call service by executing the application related to the voice call, when the voice "call Jenny" is received while the function of receiving the user input is activated. The electronic device may identify that a plurality of user's schedules 513 and 515 related to "Jenny" are displayed on a schedule application screen 513 displayed on the display when the function of receiving the user input is activated.

For example, if the application screen related to the voice call is not displayed on the display while the user is making the voice call with the other party, the electronic device may display a user interface 533, which can select the information on the user's schedule related to "Jenny" and whether to transmit the information, on the voice call termination screen 530. According to an example embodiment, if there is more than two the user's schedule related to "Jenny", the user may select the user interface capable of identify the detailed information on the user's schedule related to "Jenny" (535).

For example, when the user selects the user interface capable of identifying the detailed information on the user's schedule related to "Jenny" (535), the electronic device may display the user interface 537, which may select the information on more than two user's schedules related to "Jenny" and whether to transmit the information, on the voice call termination screen 530. At this time, the user may select at least one of information on more than two user's schedules related to "Jenny" (539).

For example, the electronic device includes a user interface 531 capable of identifying contact information on a voice call counterpart after the termination of the voice call and/or a voice call termination screen 530 including a user interface 532 related to performing the function after the voice call termination.

Referring to FIG. 5D, for example, the electronic device may activate a function to receive a user input in a state in which a schedule application screen 510 is displayed on the display. The electronic device may determine the other party of the voice call to be "John" and perform the voice call service by executing the application related to the voice call, when the voice "call John" is received while the function of receiving the user input is activated.

According to an example embodiment, the electronic device may identify that a user's schedule related to "John" is not displayed on the schedule application screen 510 displayed on the display when the function of receiving the user input is activated. At this time, the electronic device may determine at least one information included in the schedule application screen 510 as the shared information, for example, based on date information and time information. For example, if the date and time at which the user activates the function of receiving the user input are Oct. 10, 2016 and 2:30 pm, the electronic device may determine a user schedule of a nearest future from 2:30 pm, Oct. 10, 2016 as the shared information from the schedule application screen 510.

For example, if the application screen related to performing the voice call is not displayed on the display while the user is making the voice call with the other party, the electronic device may display a user interface 543, which may select the information determined as the shared information on the schedule application screen and whether to transmit the information, on the voice call termination screen 540.

For example, the electronic device includes a user interface 541 capable of identifying contact information on a voice call counterpart after the termination of the voice call and/or a voice call termination screen 542 including a user interface 540 related to performing the function after the voice call termination.

FIG. 6 is a diagram illustrating an example of performing a function of sharing a photograph related to a call partner after a call ends according to various embodiments of the present disclosure.

Referring to FIG. 6, for example, the electronic device may activate a function to receive a user input in a state in which a photograph management screen 610 is displayed on the display. For example, the electronic device may receive the preset voice command "Hi-Galaxy" and activate the function to receive the user input. For example, the electronic device may determine the other party of the voice call to be "Jenny" and perform the voice call service by executing the application related to the voice call when the voice "call Jenny" is received while the function of receiving the user input is activated.

For example, the electronic device may display a photograph management application screen 610 including a user interface 613 related to the photograph management.

The electronic device may identify whether a photograph related to "Jenny" 611 is displayed on the photograph management application screen 610 displayed on the display when the function of receiving the user input is activated. For example, when the photograph displayed on the screen of the photograph management application 611 is a photograph included in the contact information (e.g., a thumbnail image) of "Jenny" stored in the electronic device, the photograph displayed on the screen of the photograph management application may be determined as the photograph related to "Jenny". For example, when the information (e.g., tag) on the photograph displayed on the screen of the photograph management application includes "Jenny", the photograph displayed on the screen of the photograph management application may be determined as the photograph related to "Jenny".

For example, if the application screen related to the voice call is not displayed on the display while the user is making the voice call with the other party, the electronic device may display a user interface 623, which may select the information on the photograph related to "Jenny" and whether to transmit the information, on a voice call termination screen 620 displayed on the display after the voice call of the user is terminated.

For example, the electronic device includes a user interface 621 capable of identifying contact information on a voice call counterpart after the termination of the voice call and/or a voice call termination screen 622 including a user interface 620 related to performing the function after the voice call termination.

Figure 7A:
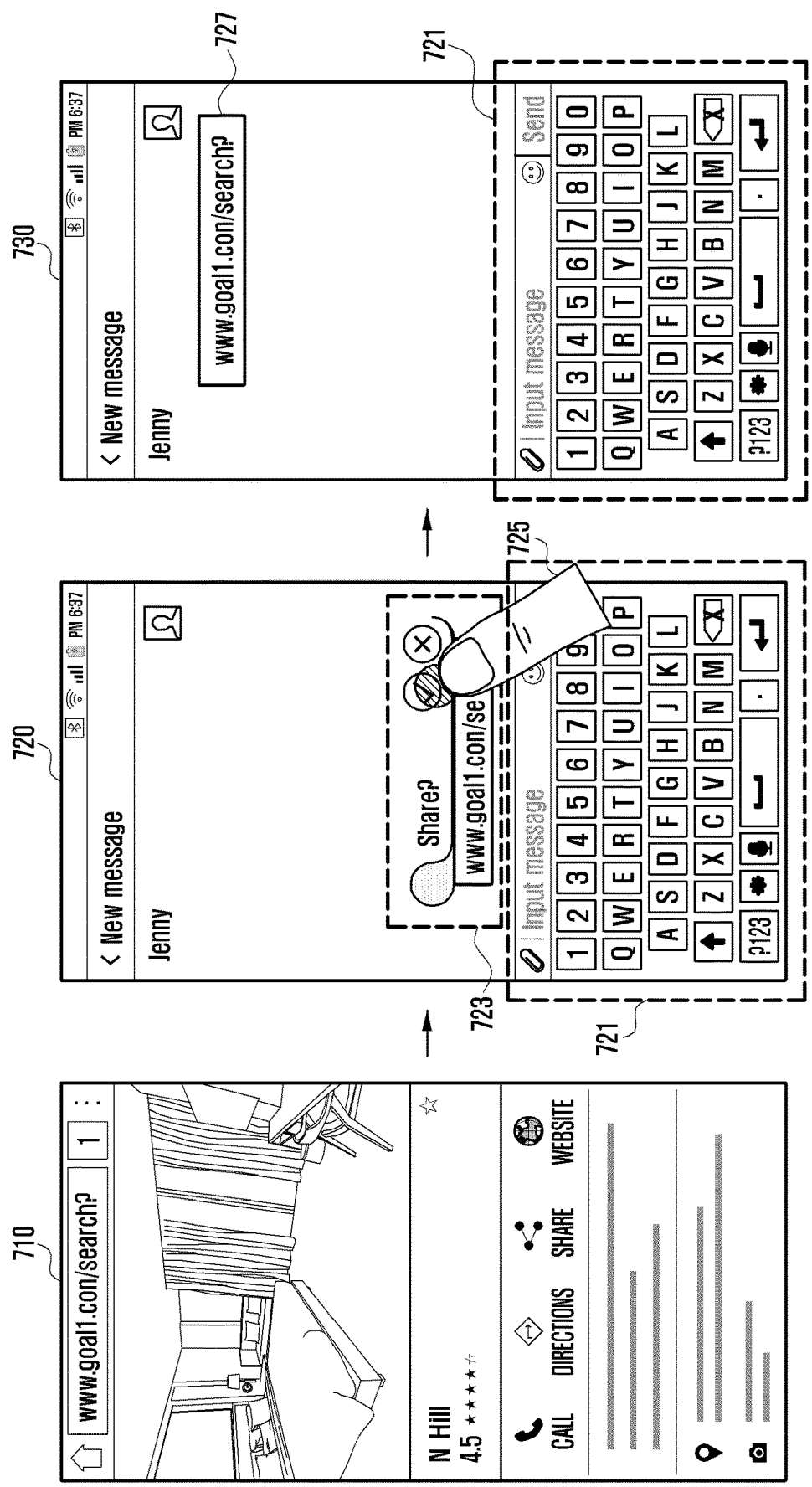
Figure 7B:
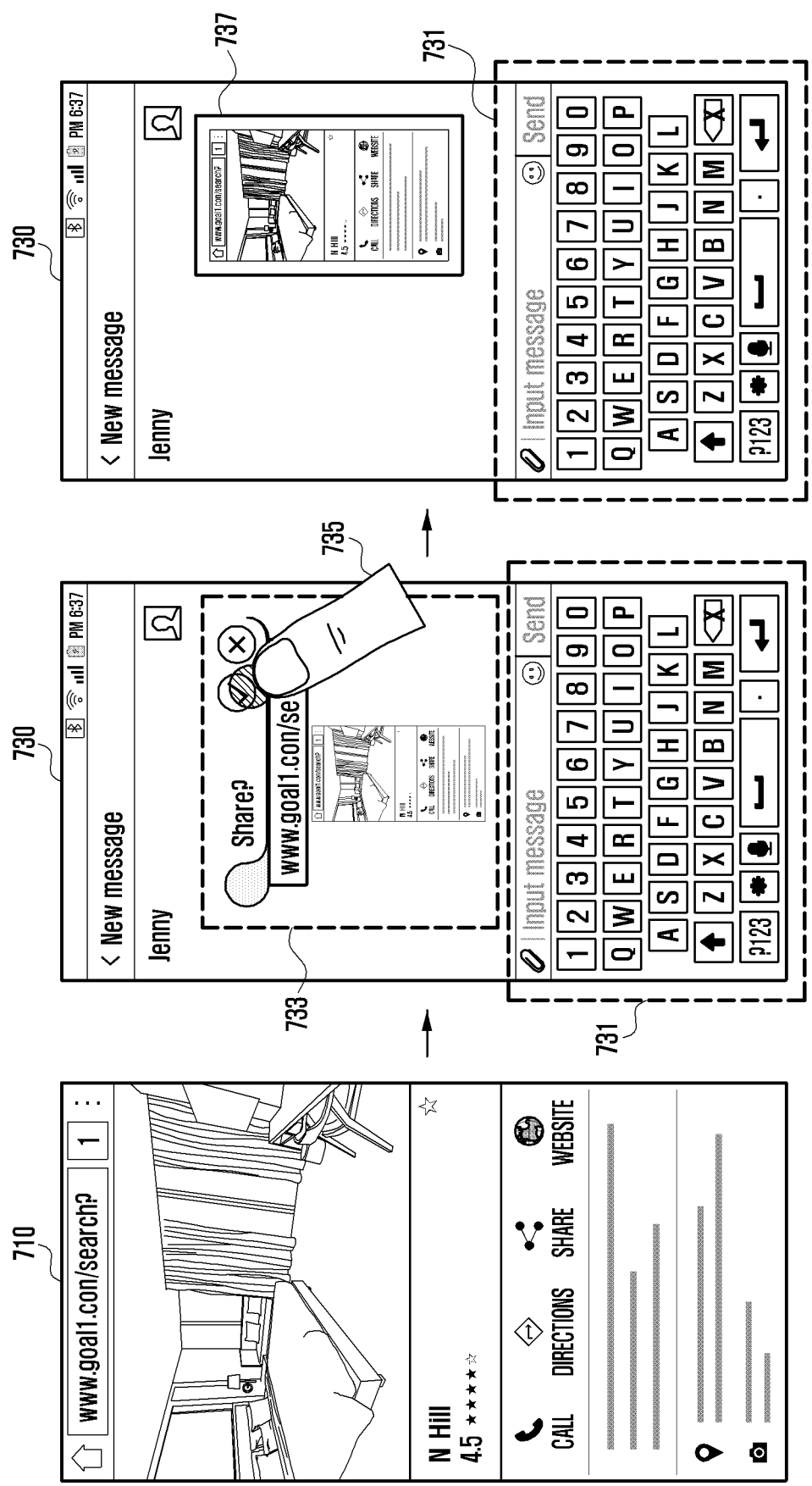

FIGS. 7A and 7B are diagrams illustrating an example of performing a function of sharing information related to an Internet browser screen using a message according to various embodiments of the present disclosure.

Referring to FIG. 7A, for example, the electronic device may activate a function to receive a user input in a state in which an Internet browser screen 710 is displayed on the display. For example, the electronic device may determine the other party, who is the transmission target of the text message, as "Jenny", and execute the application related to the text message, when the voice "send a text message to Jenny" is received while the function of receiving the user input is activated. The electronic device may identify that the information related to "Jenny" is not displayed on the Internet browser screen 710 displayed on the display when the function of receiving the user input is activated. At this time, for example, the electronic device may determine the URL information corresponding to the Internet browser screen 710 as the shared information.

For example, the electronic device may display the user interface 723, which can select the identified URL information and whether to transmit the information, on the application screen 720 related to the text message. At this time, the user may select an interface to grant sharing the URL information with "Jenny" who is the other party "Jenny" (725).

According to an example embodiment, the application screen 730 related to the text message may include a user interface 721 related to a keypad which may receive the user input for the text message.

For example, the electronic device may transmit the text message including the URL information to the electronic device of "Jenny" when the user grants the URL information (727).

Referring to FIG. 7B, similar to that described above in FIG. 7A, for example, the electronic device may activate the function of receiving the user input in which the Internet browser screen 710 is displayed on the display, determine the other party, who is the transmission target of the text message, as "Jenny", and execute the application related to the text message. The electronic device may identify that the information related to "Jenny" is not displayed on the Internet browser screen 710 displayed on the display when the function of receiving the user input is activated. At this time, for example, the electronic device may determine the image corresponding to the Internet browser screen 710 as the shared information.

For example, the electronic device may display the user interface 733, which can select the identified image information and whether to transmit an image, on the application screen 730 related to the text message. At this time, the user may select an interface to grant sharing the image with "Jenny" who is the other party "Jenny" (735).

According to an example embodiment, the application screen 730 related to the text message may include a user interface 731 related to a keypad which may receive the user input for the text message.

For example, the electronic device may transmit the text message including the image corresponding to the Internet browser screen to the electronic device of "Jenny" when the user grants the sharing of the image corresponding to the Internet browser screen (737).

FIG. 8 is a flowchart illustrating a method for sharing information of an external electronic device communicating with an electronic device according to various embodiments of the present disclosure. Detailed explanations of the contents overlapping with those described in FIGS. 4A, 4B, 4C and 4D will not be repeated. According to various embodiments, the external electronic device may include all or a portion of an electronic device 101 shown in FIG. 1.

According to various embodiments, at operation 801, the external electronic device (e.g., the processor 120 of the electronic device including the processing circuit) may activate the function for receiving the user input.

According to various embodiments, at operation 803, the external electronic device may receive the user input and determine whether the received user input is a user input for execution of an application related to a communication service.

According to various embodiments, at operation 805, the external electronic device may perform a function corresponding to a received user input if the received user input is not a user input for execution of the application related to the communication service.

According to various embodiments, at operation 807, the external electronic device may transmit the user input for the execution of the application related to the communication service may be transmitted to the communicating electronic device if the received user input is the user input for the execution of the application related to the communication service.

According to various embodiments, at operation 809, the external electronic device may receive a command for performing the function associated with the communication service from the communicating electronic device. For example, the external electronic device may receive from the electronic device the command related to the execution of the application related to the communication service included in the external electronic device. For example, the external electronic device may receive from the electronic device the command to control to display the application screen associated with the communication service on the display of the external electronic device. For example, the external electronic device may receive from the electronic device the command to control to display the information received from the electronic device on the display of the external electronic device. For example, the external electronic device may receive from the electronic device a command to control to display the user interface, which may select whether to transmit the information, on the display of the external electronic device.

According to various embodiments, at operation 811, the external electronic device may perform the function related to the communication service according to the command received from the electronic device.

According to various embodiments, at operation 813, the external electronic device may determine whether to receive a terminate command for the function related to the communication service from the electronic device. For example, if the external electronic device has not received the termination command from the electronic device, the external electronic device may branch to the 809 operation and receive the command for performing the function related to the communication service.

For example, if the external electronic device transmits the response signal indicating whether to transmit the information determined as the shared information to the electronic device, the external electronic device may determine that the termination command is received from the electronic device and terminate the process, based on the user input for the user interface which may select whether to transmit the information.

FIGS. 9A and 9B are flowcharts illustrating a method for sharing information of an electronic device communicating with an external electronic device according to various embodiments of the present disclosure. Detailed explanations of the contents overlapping with those described in FIGS. 4A, 4B, 4C and 4D and 8 will not be repeated.

Referring to FIG. 9A, at operation 901, the electronic device (e.g., the processor 120 of the electronic device including the processing circuit) may receive the user input for the execution of the application associated with the communication service from the external electronic device.

According to various embodiments, at operation 903, the electronic device may request the information on the application executed by the external electronic device and the information on the screen output through the display of the external electronic device, and receive the information on the application and the information on the screen from the external electronic device. For example, the electronic device may receive the information on the application executed by the external electronic device and/or the information on the screen output through the display of the external electronic device from the external electronic device before the operation 901. For example, the electronic device may store the information on the application received from the external electronic device and the information on the screen in the memory.

According to various embodiments, at operation 905, the electronic device may determine the other party of the communication service based on the user input received from the external electronic device.

According to various embodiments, at operation 907, the electronic device may execute the application related to the communication service based on the user input received from the external electronic device.

According to various embodiments, at operation 909, the electronic device may transmit the command to control the external electronic device to perform the function for the application related to the communication service to the external electronic device.

According to various embodiments, at operation 911, the electronic device may identify the application executed by the electronic device and the application executed by the external electronic device when the function of receiving the user input is activated in the external electronic device. For example, the electronic device may identify the application executed by the electronic device or the external electronic device based on the information of the application stored in the memory when the function of receiving the user input is activated in the external electronic device. For example, the electronic device may identify the executed application when the function of receiving the user input is activated in the external electronic device, based on the information (e.g., time when the user input for performing the function of the application is received) on the time when the function related to the application is performed by the electronic device or the external electronic device.

According to various embodiments, at operation 913, the electronic device may identify (determine) the information on the screen related to the application displayed on the electronic device or the external electronic device when the function of receiving input is activated in the external electronic device. For example, the electronic device may identify the information on the screen related to the application displayed when the function of receiving the user input is activated in the external electronic device, based on the information on the screen related to the application of the electronic device or the external electronic device stored in the memory.

For example, the electronic device may identify whether the information related to the other party of the communication service is displayed on the screen related to the application displayed when the function of receiving the user input is activated in the external electronic device.

According to various embodiments, at operation 915, the electronic device may determine as the shared information the information related to the other party of the communication service displayed on the screen, in the case in which the information related to the other party of the communication service is displayed on the screen related to the application displayed when the function of receiving the user input is activated in the external electronic device.

According to various embodiments, at operation 917, the electronic device may determine as the shared information at least one information displayed on the screen related to the application displayed when the function of receiving the user input is activated according to the predefined criterion, in the case in which the information related to the other party of the communication service is not displayed on the screen related to the application displayed when the function of receiving the user input is activated in the external electronic device. The criterion for identifying at least one information may be, for example, arbitrarily set by a user in an electronic device, and may be set individually for each application. For example, the electronic device may identify that the process of sharing the information with the other party, in the case in which the information related to the other party of the communication service is not displayed on the screen related to the application displayed when the function of receiving the user input is activated in the external electronic device.

Referring to FIG. 9B, according to various embodiments, at operation 919, the electronic device may display the information, which is determined as the shared information at operation 915 or 917, to the external electronic device.

For example, the electronic device may transmit a command to control to display the information on the display of the external electronic device to the external electronic device. For example, the electronic device may transmit to the external electronic device the command to control to display the user interface, which may select whether to transmit the information, on the display of the external electronic device.

According to various embodiments, at operation 921, the electronic device may determine whether to output the screen through the display. For example, when the user makes the voice call with the other party using the external electronic device, the electronic device may determine that the screen may be output through the display. According to an example embodiment, when the communication service is the text message, the electronic device may determine that the screen may be output through the display.

According to various embodiments, at operation 923, the electronic device may display the information determined as the shared information at operation 915 or operation 917 on the display, if it is determined that the screen may be output through the display at operation 921.

According to various embodiments, at operation 925, the electronic device may determine whether to transmit the information determined as the shared information to the other party's electronic device. For example, if the information determined as shared information is displayed on the display of the electronic device, the electronic device may display the user interface, which can select whether to transmit the information, on the display and determine whether to transmit the information based on the user input for the user interface. For example, if the information determined as the shared information is not displayed on the display of the electronic device, the electronic device may receive an instruction as to whether to transmit the information from the external electronic device and determine whether to transmit the information based on the received instruction.

According to various embodiments, at operation 927, if the electronic device may transmit the information determined as sharing the information with the other party, the electronic device may transmit the information determined as the shared information to the other party's electronic device.

Although not shown in FIG. 9B, the electronic device may also transmit the termination command for the function related to the communication service to the external electronic device, for example, if it is determined whether or not to transmit the information determined as the shared information.

FIG. 10 is a diagram illustrating an example of performing a function of sharing a photograph associated with a call partner displayed on a screen of an electronic device according to various embodiments of the present disclosure.

Referring to reference numeral 1001 in FIG. 10, an electronic device 1010 can activate a function of receiving a user input while a photograph management application screen is displayed on a display of the electronic device 1010. For example, the electronic device 1010 may determine the other party of the voice call to be "Jenny" and perform the voice call service by executing the application related to the voice call when the voice "call Jenny" is received while the function of receiving the user input is activated.

For example, the electronic device 1010 may identify that the application displayed on the display is the photograph management application executed by the electronic device 1010 when the function of receiving the user input is activated. The electronic device 1010 may identify that a photograph 1015 related to "Jenny" is displayed on the photograph management application screen displayed on the display when the function of receiving the user input is activated. For example, the electronic device 1010 may display a user interface 1013 related to photograph management on the photograph management application screen.

Referring to reference numeral 1002 in FIG. 10, for example, the electronic device 1010 may display the photograph 1015 related to "Jenny" displayed on the photograph management application screen to the external electronic device 1020 when the screen is not displayed on the display of the electronic device 1010 while the user uses the electronic device 1010 to make a voice call with the other party.

For example, the external electronic device 1020 may display a screen 1025 including the user interface which may select the photograph related to "Jenny" and whether to transmit the photograph on the display of the external electronic device 1020 when the screen is not displayed on the display of the electronic device 1010 while the user uses the electronic device 1010 to make a voice call with the other party.

FIG. 11 is a diagram illustrating an example of performing a function of sharing a photograph associated with a call partner displayed on a screen of an electronic device according to various embodiments of the present disclosure.

Referring to reference numeral 1101 in FIG. 11, an electronic device 1110 may receive the input for the execution of the application related to the communication service from the external electronic device 1120 while a photograph management application screen is displayed on a display of the electronic device 1110. For example, if the electronic device 1110 receives an input corresponding to "Jenny" and "call me" from the external electronic device 1120, the other party of the voice call may be determined to be "Jenny" and the application related to the voice call may be executed to perform the voice call service. For example, the electronic device 1110 may display a user interface 1113 related to photograph management on the photograph management application screen.

For example, the electronic device 1110 may transmit an instruction to control the external electronic device 1120 to execute the function for the application related to the voice call to be executed to the external electronic device 1120.

For example, the electronic device 1110 may identify that the application executed immediately before receiving the input from the external electronic device 1120 is the photograph management application executed by the electronic device 1110. The electronic device 1110 may identify that a photograph 1111 related to "Jenny" is displayed on the photograph management application screen executed immediately before receiving the input from the external electronic device 1120.

Referring to reference numeral 1102 in FIG. 11, the external electronic device 1120 may execute the application related to the voice call based on the instruction received from the electronic device 1110. For example, the external electronic device 1120 may display an application screen 1125 related to the voice call.

For example, if the user uses the external electronic device 1120 to make the voice call with the other party the external electronic device 1110, the electronic device 1110 may determine that the screen may be output through the display and display a screen 1115 including the user interface which may select the photograph related to "Jenny" and whether to transmit the photograph on the display of the external electronic device 1110.

For example, the electronic device 1110 may search for at least one photograph which has an association with a photograph 1111 related to "Jenny" displayed on the screen of the photograph management application among the photographs stored in the memory. At this time, for example, the electronic device 1110 may compare the information on the photograph 1111 (e.g., tag information) related to "Jenny" with the information on at least one photograph stored in the memory. As another example, the electronic device 1110 may recognize (e.g., face recognition) an object included in the photograph 1111 related to "Jenny", and include an object included in at least one photograph stored in the memory. In this case, the electronic device 1110 may display on the display at least one photograph 1117 having relevance retrieved from the memory, along with the photograph 1111 related to "Jenny" displayed on the screen of the photograph management application. For example, if the user input for selecting at least one photograph 1117 having relevance is received, the electronic device 1110 may transmit at least one photograph 1117 having relevance to the other party's electronic device along with the photograph 1111 related to "Jenny".

For example, the external electronic device 1020 may display the information on the photograph related to "Jenny" on the display of the external electronic device 1020 when the screen is not displayed on the display of the electronic device 1010 while the user uses the electronic device 1010 to make the voice call with the other party.

FIG. 12 is a diagram illustrating an example of performing a function of sharing a photograph associated with a call partner displayed on a screen of an electronic device according to various embodiments of the present disclosure.

Referring to reference numeral 1201 in FIG. 12, an external electronic device 1210 may transmit an input for execution of an application related to a communication service to the external electronic device 1210 while a photograph management application screen is displayed on a display of an external electronic device 1210. For example, if the electronic device 1210 receives an input corresponding to "Jenny" and "call me" from the external electronic device 1220, the other party of the voice call may be determined to be "Jenny" and the application related to the voice call may be executed to perform the voice call service.

For example, the electronic device 1210 may transmit an instruction to control the external electronic device 1220 to execute the function for the application related to the voice call to be executed to the external electronic device 1220.

For example, the electronic device 1210 may identify that the application executed immediately before receiving the input from the external electronic device 1220 is the photograph management application executed by the external electronic device 1210. The electronic device 1210 may identify that a photograph related to "Jenny" is displayed on the photograph management application screen executed by the external electronic device 1220 immediately before receiving the input from the external electronic device 1220.

Referring to reference numeral 1202 in FIG. 12, the external electronic device 1220 may execute the function of the application related to the voice call based on the instruction received from the electronic device 1210. For example, the external electronic device 1220 may display an application screen 1225 related to the voice call.

For example, if the user uses the external electronic device 1210 to make the voice call with the other party the external electronic device 1220, the electronic device 1210 may determine that the screen may be output through the display and display a user interface 1215 which may select the photograph related to "Jenny" and whether to transmit the photograph on the display of the electronic device 1210.

For example, the electronic device 1210 may search for at least one photograph which has an association with a photograph related to "Jenny" displayed on the screen of the photograph management application among the photographs stored in the memory. In this case, the electronic device 1210 may display on the display at least one photograph 1217 having relevance retrieved from the memory, along with the photograph related to "Jenny" displayed on the screen of the photograph management application. For example, if the user input for selecting at least one photograph 1217 having relevance is received, the electronic device 1210 may transmit at least one photograph 1215 having relevance to the other party's electronic device along with the photograph 1217 related to "Jenny".

FIG. 13 is a diagram illustrating an example of a screen related to an application that provides a function of receiving a user input displayed on displays of an electronic device and an external electronic device, respectively, according to various embodiments of the present disclosure.

Referring to reference numeral 1301 in FIG. 13, when the function for receiving the user input is activated, an electronic device 1310 displays a screen 1313 related to an application providing a function of receiving a user input on a display. For example, if the function of receiving the user input is activated, the electronic device 1310 may display the screen 1313 related to the application providing the function of receiving the user input in one area of the screen 1311 related to the schedule application displayed on the display when the function of receiving the user input is activated. At this time, for example, the electronic device 1310 may change one area of the screen 1311 related to the schedule application to a screen 1313 related to the application providing the function of receiving the user input and display it. Alternatively, for example, the electronic device 1310 may control the screen 1313 related to the application providing the function of receiving the user input to be displayed while overlaying on one area of the screen 1311 related to the schedule application.

For example, the electronic device 1310 may include on a screen 1313 related to application providing a function of receiving a user input at least one of a user interface 1315 for providing information related to performing a function (e.g., an indicator to guide a user input method, a history of the user input, etc.), a user interface 1317 for providing a function for displaying examples a user input on a screen and a user to select any one of the examples displayed on the screen as a user input, and a user interface 1319 for displaying the user input currently input to the electronic device 1310 as a text.

Referring to reference numeral 1302 in FIG. 13, when the function for receiving the user input is activated, an external electronic device 1320 may display a screen 1321 related to an application providing a function of receiving a user input on a display. According to an example embodiment, when the size of the display of the external electronic device 1320 is smaller than a certain size, only the user interface 1323, which displays the user input currently being input to the external electronic device 1320 as a text may be displayed on the display. If the size of the display of the external electronic device 1320 is larger than a certain size, various user interfaces, such as the electronic device 1310 of the reference numeral 13101, may be displayed through the display.

FIG. 14 is a diagram illustrating an example of a user interface capable of select whether to transmit information related to the other party displayed on displays of an electronic device and an external electronic device, respectively, according to various embodiments of the present disclosure.

Referring to reference numeral 1401 in FIG. 14, an electronic device 1410 may display a screen 1415 including a user interface which may select a photograph related to "Jenny" and whether to transmit the photograph, through the display. For example, the electronic device 1410 may retrieve at least one photograph which has an association with a photograph related to "Jenny" among the photographs stored in the memory. At this time, for example, the electronic device 1410 may compare the information on the photograph (e.g., tag information) related to "Jenny" with the information on at least one photograph stored in the memory. As another example, the electronic device 1410 may recognize (e.g., face recognition) an object included in the photograph related to "Jenny", and include an object included in at least one photograph stored in the memory. In this case, the electronic device 1410 may display on the display at least one photograph 1417 having relevance retrieved from the memory, along with the photograph related to "Jenny" displayed on the screen of the photograph management application. For example, the electronic device 1410 may provide a user interface for the user to select at least one photograph 1417 having relevance. At this time, when a user input for selecting at least one photograph 1417 having relevance is received via the user interface, at least one photograph 1417 having relevance may also be transmitted to the other party's electronic device along with a photograph related to "Jenny.

Referring to reference numeral 1402 in FIG. 14, an external electronic device 1420 may receive a photograph related to "Jenny" from a communicating electronic device and may display a screen 1425 including a user interface which may select a photograph related to "Jenny" and whether to transmit a photograph on a display of the external electronic device 1420. According to an example embodiment, the electronic device that transmits the photograph related to "Jenny" to the external electronic device 1420 may identify the size of the display of the external electronic device 1420, and may determine the information to be transmitted to the external electronic device 1420 according to the size of the display. For example, if it is determined that the size of the display of the external electronic device 1420 is smaller than a certain size, the electronic device may transmit only the photograph related to "Jenny" to the external electronic device 1420, and the external electronic device 1420 may display a screen 1425 including the photograph related to "Jenny". According to an example embodiment, if the size of the display of the external electronic device 1420 is greater than a certain size, then the external electronic device 1420 may receive another photograph having a relevant photograph related to "Jenny" from the electronic device.

The term "module" as used herein may, for example, refer to a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include, without limitation, at least one of a dedicated processor, a CPU, an Application-Specific Integrated Circuit (ASIC) chip, a Field-Programmable Gate Arrays (FPGA), and/or a programmable-logic device, or the like, for performing operations which has been known or are to be developed hereinafter. According to various embodiments, at least some of the devices (for example, modules or functions thereof) or the method (for example, operations) according to the present disclosure may be implemented by a command stored in a computer-readable storage medium in a programming module form. The instruction, when executed by a processor (e.g., the processor 120), may cause the one or more processors to execute the function corresponding to the instruction. The computer-readable recoding media may be, for example, the memory 130.

The computer readable recording medium may include a hard disk, a floppy disk, a magnetic medium (e.g., a magnetic tape), an optical storage medium (e.g., a Compact Disc-ROM (CD-ROM) or a Digital Versatile Disc (DVD), a magnetic-optic medium such as a floptical disc), an internal memory, or the like. The instruction may include a code created by a compiler or a code executable by an interpreter. The module or programming module according to various embodiments may further include at least one or more elements among the aforementioned constitutional elements, or may omit some of them, or may further include other elements. Operations performed by a module, programming module, or other elements according to various embodiments may be executed in a sequential, parallel, repetitive, or heuristic manner. Alternatively, at least some of the operations may be executed in a different order or may be omitted, or other operations may be added.

The embodiments of the disclosure disclosed herein and in the drawings illustrate specific examples to easily explain technical contents according the embodiments of the present disclosure and help understanding the embodiments of the present disclosure, and are not intended as limiting the scope of the embodiment of the present disclosure. Therefore, it is to be understood that in addition to various embodiments of the present disclosure, all modifications or alternations derived based on a technical spirit of various embodiments of the present disclosure are included in the scope of various embodiments of the present disclosure.

What is claimed is:

1. An electronic device, comprising:
a display;
a communication module comprising communication circuitry;
a processor; and
a memory configured to store information on an application executed by the processor and information on a screen output through the display,
wherein the processor is configured to:
receive an input for execution of a first application related to a communication service while a screen for a second application is displayed on the display,
determine information related to an other party of the communication service based on the received input,
determine whether the information related to the other party is included on the screen for the second application output through the display when the input is received,
if the information related to the other party included on the screen for the second application is included in the screen for the second application, cause the display to display the information related to the other party on a screen of the first application, if the execution screen of the first application is displayed through the display while the communication service is performed,
if the information related to the other party is included in the screen for the second application, causes the display to display the information related to the other party on the screen of the first application after the communication service is terminated, if the execution screen of the first application is not displayed through the display while the communication service is performed, and
transmit the information related to the other party, to the other party, through the communication module after the communication service is terminated.

2. The electronic device of claim 1, wherein the first application related to the communication service comprises an application related to at least one of: a voice call, a video call, a voice message, a text message, a messenger, and/or an e-mail.

3. The electronic device of claim 1, wherein the input includes a voice input, and
wherein the processor is configured to receive the voice input for execution of the first application while a function for receiving the voice input is activated.

4. The electronic device of claim 1, wherein the processor is configured to transmit at least one of: the information included on the screen for the second application to the other party through the communication module based on a set criterion, if the information related to the other party is not included on the screen for the second application.

5. The electronic device of claim 4, wherein the set criterion comprises a criterion based on at least one of: date information, time information, and/or positional information.

6. The electronic device of claim 1, wherein the processor is configured to determine whether another information related to the information related to the other party is stored in the memory.

7. The electronic device of claim 1, wherein the processor is configured to:
receive information on an application executed by at least one external electronic device and information on a screen output through a display of the at least one external electronic device from at least one external electronic device communicating with the electronic device through the communication module, and
determine the screen for the second application output when the input is received from among the screen output through the display and the screen output through the display of the at least one external electronic device.

8. The electronic device of claim 7, wherein the processor is configured to:
display the information related to the other party on the screen output while a function related to the first application is performed, if the screen is output through the display while the function related to the communication service is performed, and
transmit the information related to the other party to the at least one external electronic device through the communication module, if the screen is not output through the display while the function related to the communication service is performed.

9. The electronic device of claim 7, wherein the processor is configured to:
receive an input for the execution of the first application from the at least one external electronic device through the communication module, and
transmit an instruction to perform the function related to the first application in the at least one external electronic device to the at least one external electronic device through the communication module.

10. The method of claim 7, further comprising:
displaying the information related to the other party on the screen output while a function related to the first application is performed, if the screen is output through the display while the function related to the communication service is performed, and
transmitting the information related to the other party to the at least one external electronic device through the communication circuitry, if the screen is not output through the display while the function related to the communication service is performed.

11. A method for sharing information of an electronic device, the method comprising:
receiving an input for execution of a first application related to a communication service, while a screen for a second application is displayed on the display,
determining information related to an other party of the communication service based on the received input,
determining whether the information related to the other party is included on the screen for the second application output through a display of the electronic device when the input is received,
if the information related to the other party included on the screen for the second application is included in the screen for the second application, displaying the information related to the other party on a screen of the first application, if the execution screen of the first application is displayed through the display while the communication service is performed,
if the information related to the other party is included in the screen for the second application, displaying the information related to the other party on the screen of the first application after the communication service is terminated, if the execution screen of the first application is not displayed through the display while the communication service is performed, and transmitting the information related to the other party to the other party through communication circuitry of the electronic device after the communication service is terminated.

12. The method of claim 11, wherein the first application related to provision of the communication service comprises an application related to at least one of: a voice call, a video call, a voice message, a text message, a messenger, and/or an e-mail.

13. The method of claim 11, wherein the input includes a voice input, and
wherein the receiving of the input for the execution of the first application includes receiving a voice input for the execution of the first application while the function for receiving the voice input is activated.

14. The method of claim 11, further comprising:
transmitting at least one of: the information included on the screen for the second application to the other party through the communication module based on a set criterion, if the information related to the other party is not included on the screen for the second application.

15. The method of claim 14, wherein the set criterion comprises a criterion based on at least one of: date information, time information, and/or positional information.

16. The method of claim 11, further comprising:
determining whether another information related to the information related to the other party is stored in a memory of the electronic device.

17. The method of claim 16, wherein the determining of the screen for the second application output through the display if the input is received includes:
receiving information on an application executed by at least one external electronic device and information on a screen output through a display of the at least one external electronic device from at least one external electronic device communicating with the electronic device through the communication circuitry, and
determining the screen for the second application output when the input is received from among the screen output through the display and the screen output through the display of the at least one external electronic device.

18. The method of claim 17, wherein the receiving of the input for the execution of the first application further includes:
receiving an input for the execution of the first application from the at least one external electronic device through the communication circuitry, and
transmitting an instruction to perform the function related to the first application in the at least one external electronic device to the at least one external electronic device through the communication circuitry.

* * * * *